(12) United States Patent
Dimitriou et al.

(10) Patent No.: US 11,769,328 B2
(45) Date of Patent: Sep. 26, 2023

(54) AUTOMATED VIDEO SEGMENTATION

(71) Applicant: Gracenote, Inc., Emeryville, CA (US)

(72) Inventors: Konstantinos Antonio Dimitriou, San Francisco, CA (US); Amanmeet Garg, Santa Clara, CA (US)

(73) Assignee: Gracenote, Inc., Emeryville, CA (US)

( * ) Notice: Subject to any disclaimer, the term of this patent is extended or adjusted under 35 U.S.C. 154(b) by 155 days.

(21) Appl. No.: 17/475,551

(22) Filed: Sep. 15, 2021

(65) Prior Publication Data
US 2023/0065773 A1 Mar. 2, 2023

(30) Foreign Application Priority Data
Sep. 2, 2021 (GR) .................... 20210100579

(51) Int. Cl.
| | |
|---|---|
| *G06V 20/00* | (2022.01) |
| *G06V 20/40* | (2022.01) |
| *G06V 10/426* | (2022.01) |
| *G06F 18/22* | (2023.01) |
| *G06F 18/214* | (2023.01) |
| *G06N 3/045* | (2023.01) |
| *H04N 21/234* | (2011.01) |

(52) U.S. Cl.
CPC ........... *G06V 20/49* (2022.01); *G06F 18/2148* (2023.01); *G06F 18/22* (2023.01); *G06N 3/045* (2023.01); *G06V 10/426* (2022.01); *G06V 20/41* (2022.01); *H04N 21/23418* (2013.01)

(58) Field of Classification Search
CPC ....... G06V 20/49; G06V 20/41; G06V 10/426; G06F 18/22; G06F 18/2148; G06N 3/045; H04N 21/23418

USPC .......................................... 382/157
See application file for complete search history.

(56) References Cited

U.S. PATENT DOCUMENTS

| | | | |
|---|---|---|---|
| 11,410,388 B1* | 8/2022 | Taghavi et al. ......... | G06T 19/20 |
| 2017/0024899 A1* | 1/2017 | Hammoud et al. ... | G06V 10/758 |
| 2022/0262108 A1* | 8/2022 | Hida ..................... | G06N 3/088 |
| 2022/0300681 A1* | 9/2022 | Ren et al. .............. | G06F 30/27 |
| 2022/0415047 A1* | 12/2022 | Elder et al. ............. | G06T 7/70 |

* cited by examiner

*Primary Examiner* — Michael R Neff
(74) *Attorney, Agent, or Firm* — McDonnell Boehnen Hulbert & Berghoff LLP

(57) ABSTRACT

Methods and systems for automated video segmentation are disclosed. A sequence of video frames having video segments of contextually-related sub-sequences may be received. Each frame may be labeled according to segment and segment class. A video graph may be constructed in which each node corresponds to a different frame, and each edge connects a different pair of nodes, and is associated with a time between video frames and a similarity metric of the connected frames. An artificial neural network (ANN) may be trained to predict both labels for the nodes and clusters of the nodes corresponding to predicted membership among the segments, using the video graph as input to the ANN, and ground-truth clusters of ground-truth labeled nodes. The ANN may be further trained to predict segment classes of the predicted clusters, using the segment classes as ground truths. The trained ANN may be configured for application runtime video sequences.

20 Claims, 10 Drawing Sheets

AUTOMATED VIDEO SEGMENTATION

CROSS-REFERENCE TO RELATED APPLICATIONS

The present application claims priority to Greek Patent Application 20210100579, filed in the Greek Patent Office on Sep. 2, 2021, and which is hereby incorporated in its entirety herein by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method for automated video segmentation carried out by a computing system is disclosed. The method may include: receiving a training sequence of training video frames comprising a plurality of respective training video segments, wherein the respective training video segments comprise non-overlapping respective sub-sequences of the training video frames, each of the respective sub-sequences being associated with respective contextually-related subject content, and wherein each training video frame is associated with a respective label identifying both which particular training video segment it belongs to, and a segment class associated with the particular training video segment; analytically constructing a training video graph from the training sequence of training video frames, the training video graph comprising nodes connected by edges, wherein each node corresponds to a different one of the respective training video frames, and each edge connects a different particular pair of nodes, and is associated with both a temporal distance between the respective training video frames corresponding to the particular pair of nodes, and a respective similarity metric quantifying similarity between respective features of the respective training video frames corresponding to the particular pair of nodes; training an artificial neural network (ANN) to compute both (i) a predicted training label for each node of the training video graph, and (ii) predicted clusters of the nodes corresponding to predicted membership among the respective training video segments of the corresponding training video frames, using the training video graph as input to the ANN, and ground-truth clusters of ground-truth labeled nodes, wherein the ground-truth labeled nodes correspond to the training video frames and their associated respective labels, and the ground-truth clusters correspond to the respective training video segments; further training the ANN to compute a predicted segment class for each of the predicted clusters, using as ground truths the segment classes of the respective training video segments; and configuring the trained ANN for application to one or more unseen runtime video sequences.

In another aspect, another method for automated video segmentation carried out by a computing system is disclosed. The method may include: receiving a sequence of video frames; analytically constructing a video graph from the sequence of video frames, the video graph comprising nodes connected by edges, wherein each node corresponds to a different one of the respective video frames, and each edge connects a different particular pair of nodes, and is associated with both a temporal distance between the respective video frames corresponding to the particular pair of nodes, and a respective similarity metric quantifying similarity between respective features of the respective video frames corresponding to the particular pair of nodes; applying an artificial neural network (ANN) to the video graph to compute both (i) predicted labels for the nodes of the video graph corresponding to predicted video-frame labels of the video frames, and (ii) predicted clusters of the nodes corresponding to predicted video segments of the sequence comprising respective sub-sequences of the video frames associated with respective contextually-related subject content, wherein the ANN has previously been trained to compute both predicted training labels for each training node of a training video graph constructed from a training video sequence of training video frames, and predicted training clusters of the training nodes corresponding to predicted membership among respective training video segments of the corresponding training video frames; further applying the ANN as trained to respectively determine a predicted segment class of each predicted video segment; and recording in memory and/or displaying information associating each video frame with one of the predicted video segments, and, for each respective predicted segment class, an identification of all predicted video segments belonging to the respective segment class.

In still another aspect, a system for automated video segmentation is disclosed. The system may include one or more processors, and memory storing instructions that, when executed by the one or more processors, cause the system to carry out various operations. The operations may include: receiving a training sequence of training video frames comprising a plurality of respective training video segments, wherein the respective training video segments comprise non-overlapping respective sub-sequences of the training video frames, each of the respective sub-sequences being associated with respective contextually-related subject content, and wherein each training video frame is associated with a respective label identifying both which particular training video segment it belongs to, and a segment class associated with the particular training video segment; analytically constructing a training video graph from the training sequence of training video frames, the training video graph comprising nodes connected by edges, wherein each node corresponds to a different one of the respective training video frames, and each edge connects a different particular pair of nodes, and is associated with both a temporal distance between the respective training video frames corresponding to the particular pair of nodes, and a respective similarity metric quantifying similarity between respective features of the respective training video frames corresponding to the particular pair of nodes; training an artificial neural network (ANN) to compute both (i) a predicted training label for each node of the training video graph, and (ii) predicted clusters of the nodes corresponding to predicted membership among the respective training video segments of the corresponding training video frames, using the training video graph as input to the ANN, and ground-truth clusters of ground-truth labeled nodes, wherein the ground-truth labeled nodes correspond to the training video frames and their associated respective labels, and the ground-truth clusters correspond to the respective training video segments; further training the ANN to compute a predicted segment class for each of the predicted clusters, using as ground truths the segment classes of the respective training video segments; and configuring the trained ANN for application to one or more unseen runtime video sequences.

DETAILED DESCRIPTION

I. Overview

Figure 1:
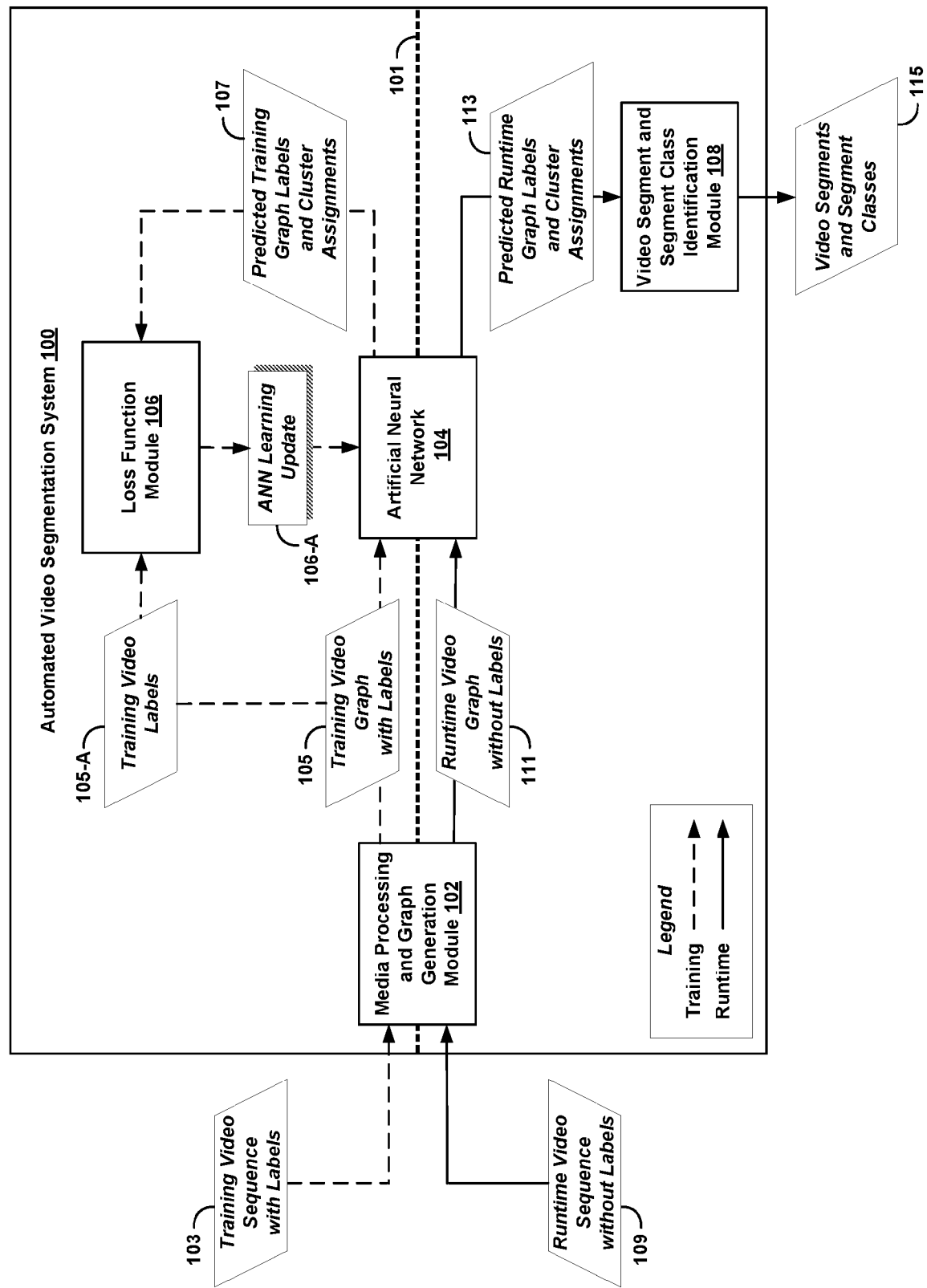
FIG. 1 is a simplified operational block diagram of a video segmentation system in which various disclosed principles can be implemented.

Content providers may provide various forms of online streaming, broadcast, and/or downloadable media content to end users, including video media, music and other audio media, and other possible forms of media content, for example. A content provider may be a direct source of content for end users, or may provide content to one or more content distribution services, such as broadcasters, which then deliver selected content to end users. An example of a content provider could be a media content company that provides media content to media distribution services, which then deliver media content to end users. End users may subscribe at a cost to one or more media distribution services or directly to one or more media content companies for content delivery, and/or may receive at least some content at no charge, such as from over-the-air broadcasters or from public internet websites that host at least some free content for delivery to end users. Media content to end users may be delivered as broadcast or streaming content for immediate playout and/or may be downloaded media files that may be locally stored on user devices for playout at any time, for example.

Content providers and/or media distribution services may be interested in being able to detect, determine, and/or identify temporal characteristics of the media content they deliver to end users. For example, in broadcasting video content, such as television (TV) programs or movies, it may be of interest to know which temporal portions correspond to primary program content and which correspond to advertising. This could allow a broadcaster to know when during a program broadcast viewers are receiving regular program content and when they are receiving advertisements, for instance. As another example involving video content, it may be of interest to identify thematically-related temporal portions of a program or movie, or to identify different genres within particular temporal portions of a video stream, or the like. Applied to a movie, for example, such a capability could facilitate identification and thematic classification of scenes for creating a movie trailer or other summary content.

Taking again the example of video content, a media program for broadcast or streaming may include a sequence of video frames that contain program content interspersed with frames containing ancillary or supplemental content, such as advertising. In the context of broadcast or streaming, these different types or categories of content may be considered different segments of the video frame sequence. So conceived, segments may be taken or defined as sub-sequences of frames containing contextually-related subject content – e.g., program segments and advertising segments. Thus, the video frames of a sub-sequence that make up any given segment may therefore be identified or associated with the segment. In addition, different non-contiguous segments may be related according to their segment classes. For example, interspersed advertisements in the video sequence may be related by virtue of their classification as advertisements, and similarly, program segments separated by advertisements may be related by virtue of their classification as program content. This relatively simple example of program segments and advertising segments of a video sequence is just one possible arrangement of multi-segmented video frame sequences. Other arrangements having more than two segment classes are possible as well.

Information associating video frames of particular sequences, such as particular programs, with segments and/or identifying segment classifications could be configured as metadata associated with the frames. Such metadata could include timing data, such as frame timestamps, and some form of segment identifier, as well information identifying segments and associated segment classes, for example. In practice, however, it may not be the case that all programs have metadata associating video frames with segments, or segments with segment classes. For example, and for various reasons, some content providers might not support or provide such information to content distributions services. Consequently, there can be circumstances in which the desired information about video segments is unavailable to services that broadcast, stream, or otherwise deliver video program content.

Conventional approaches for generating video segmentation information typically involve some form of human curation, editing, and/or evaluation of video programs in order to identify and distinguish between segments of the video programs. In view of the large numbers of video programs that need to be analyzed, and the temporal length of many programs, the conventional approach tends to be tedious and inefficient, as well as generally unscalable. Thus, a content delivery service, such as a broadcaster, may have no practical way to acquire or obtain video segmentation information.

Accordingly, there is a need for automated segmentation of media content, and in particular for video content. In view of this need, and the challenges to conventional approaches for video segmentation, the inventors have recognized that machine learning (ML) techniques implemented by one or more computing devices or systems may be used to automate segmentation of video frame sequences into frame sub-sequences of contextually-related subject matter. In particular, example embodiments disclosed herein provide systems and methods for ML-based association of video frames with video segments, as well as identification of segment classes. The inventors have further devised techniques for applying neural networks to video graphs generated from video frame sequences in order to predict clustering of frames according to video segments, and to predict segment classes.

While the techniques disclosed herein are described by way of example in terms of video frame sequences, such as broadcast and/or streaming video, the techniques may be extended to other forms of frame-based or sequence-based media, such as audio media. Further, by applying graph neural networks (GNNs) to video graphs in order, as described below, to generate embeddings, the disclosed techniques may also be applied to tasks other than segmentation and segment classification. That is, the embeddings generated by a GNN may be input to ML-based tasks such as theme and/or genre identification, which in turn could be used in creating movie trailers or other summary content. These are just some examples of possible extension of aspects of embodiments involving GNNs.

II. Architecture

A. Example System For Automated Video Segmentation

FIG. 1 is a simplified operational block diagram of an automated video segmentation system 100 that may be configured to automate segmentation of video, audio, and/or other forms of streaming and/or broadcast media content, for example. As used herein, the term "video segmentation" will generally be taken to mean identification of particular portions or segments of a video-frame sequence, each segment being made up of sub-sequences of video frames that contain contextually-related subject content. Video segmentation will also generally refer to identification of a segment class for each identified segment. Additionally, video segmentation may refer to both the information obtained and the process for obtaining it, and in particular the techniques for automated video segmentation of example embodiments described herein.

The automated video segmentation system 100 can include various components, any one or more of which may be implemented as or in one or more computing devices. As such, components of the automated video segmentation system 100 may themselves be or include hardware, software, firmware, or combinations thereof. Some of the components of the automated video segmentation system 100 may be identified structurally, such as databases or other forms of data storage and management, and others are identified in terms of their operation or function. Operational and/or functional components could be implemented as software and/or hardware modules, for example, and will sometimes be referred to herein as "modules" for the purpose of the present discussion.

Non-limiting example components of the automated video segmentation system 100 include a media processing an graph generation module 102, an artificial neural network (ANN) 104, a loss function module 106 and ANN learning update operation 106-A, and a video segment and segment class identification module 108. In addition, FIG. 1 depicts a number of data elements or constructs that are generated by and passed between system components. These are described below in the context of example operation.

The automated video segmentation system 100 can also include one or more connection mechanisms that connect various components within the system 100. By way of example, the connection mechanisms are depicted as arrows between components. The direction of an arrow may indicate a direction of information flow, though this interpretation should not be viewed as limiting. As described below, the automated video segmentation system 100 may operate in a training mode and/or a runtime mode. For purposes of illustration, connection mechanisms that serve training operation are depicted with dashed lines, while connection mechanisms that serve runtime operation are depicted with solid lines, as indicated by the legend in FIG. 1.

In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. A connection mechanism may also include programmed communication between software and/or hardware modules or applications, such as application program interfaces (APIs), for example. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

Generally, the automated video segmentation system 100, may operate in two modes: training mode and runtime mode. In training mode, the automated video segmentation system 100 may be "trained" to predict video segmentation using one or more training video sequences as input and "ground-truth" (i.e., known) video segmentation of the inputs to train or adjust the ML-based model (e.g., the ANN) by applying one or another technique for updating ANN learning. Non-limiting examples include known techniques such as back-propagation techniques. However, other techniques may be used as well. In runtime mode, the automated video segmentation system 100 may operate to predict video segmentation of one or more runtime video frame sequences.

Example operation of the automated video segmentation system 100 may be understood in more detail as follows. During training operation, depicted above the horizontal dashed line 101, one or more labeled training video sequences 103 may be input to the media processing and graph generation module 102, which generates a training video graph 105 from each sequence of video frames. Each training video sequence may correspond to a video program, such as a movie or TV show, for example, and includes or is labeled with known video segmentation information, such as identification of regular program segments and advertising segments. In example embodiments, the labels referred to herein may include the known video segmentation information. More specifically, each training video frame of a training video sequence may have an associated label that identifies a video segment to which the frame belongs, as well as segment class associated with the segment. The video segmentation information of the training video sequences may be contained or included in metadata, for example, and may be generated by a human curator or editor using conventional techniques. Additionally or alternatively, some or all training video sequences may have been generated by prior application of an already-trained automated video segmentation system. Although not shown in FIG. 1, the training video sequences with labels 103 may be stored in a database, and accessed during training.

The training video graph 105 may be input to the ANN 104, which may compute the predicted training graph labels and cluster assignments 107. As described below, each node of the training video graph corresponds to a different training video frame of the training video sequence 103, and the predicted clusters correspond to predicted membership of the training video frames among predicted segments of the training video sequence 103. That is, the predictions are made without reference to the labels. The predicted training graph labels and cluster assignments 107 are input to the loss function module 106. At the same time, the training labels 105-A, which serve as ground-truths, are also input to the loss function module, and compared with the predicted training graph labels and cluster assignments 107, and the parameters of the ANN are adjusted in an ANN learning update process 106-A. In an example embodiment an ANN learning update process could be back-propagation, in accordance with known techniques. However, other techniques for updating ANN learning, either known or developed in the future, could be used.

The above training process is repeated iteratively per training video sequence 103, and over multiple training video sequences until a threshold level of prediction accuracy is achieved. This could correspond to training predictions that are within a prescribed statistical confidence level of the known ground truths, for example. As described in more detail below, through the training operations, the ANN is trained to accurately predict labeling the nodes of the training video graph according to labels of the corresponding training video frames, and to thereby accurately predict the known segments (i.e., ground truths) of the training video sequences, as well as accurately predict membership of the training video frames among the training sequences, and identification of the segment classes of the training video segments.

During runtime operation, depicted below the horizontal dashed line 101, an unlabeled runtime video sequence 109 may be input to the media processing and graph generation module 102, which generates an unlabeled runtime video graph 111 from the runtime video sequence 109. The runtime video graph 111 may be input to the ANN 104, which may compute the predicted runtime graph labels and cluster assignments 113. As described below, each node of the runtime video graph 111 corresponds to a different runtime video frame of the runtime video sequence 109, and the predicted clusters correspond to predicted membership of the runtime video frames among predicted segments of the runtime video sequence 109. The predicted runtime graph labels and cluster assignments 113 may then be input to the video segment and segment class identification module 108, which generates the predicted video segments and segment classes 115, which in turn form the output video segmentation of the automated video segmentation system 100.

The runtime processing may be carried automatically for any runtime video sequence that might otherwise lack video segmentation information. Automating the video segmentation process with a trained video segmentation system 100 enables a broadcaster or content distribution service provider to generate video segmentation automatically for any video program. The process can be carried out ahead of time to generate a library or other collection of segmented video programs, or in real time as a video program is being broadcast or streamed. An automated video segmentation system 100 may be implemented on a server or other backend computing system of a content provider or content distribution service provider, and used for creating an inventory of segmented video programs, or segmenting video streams during streaming or broadcast.

Further details of an example automated video segmentation system 100 are described below. As noted, an automated video segmentation system 100 and/or components thereof can take the form of, be part of, or include or encompass, a computing system or computing device. Before describing example operation of an automated video segmentation system 100, an example of a computing system or device is first described.

B. Example Computing System

Figure 2:
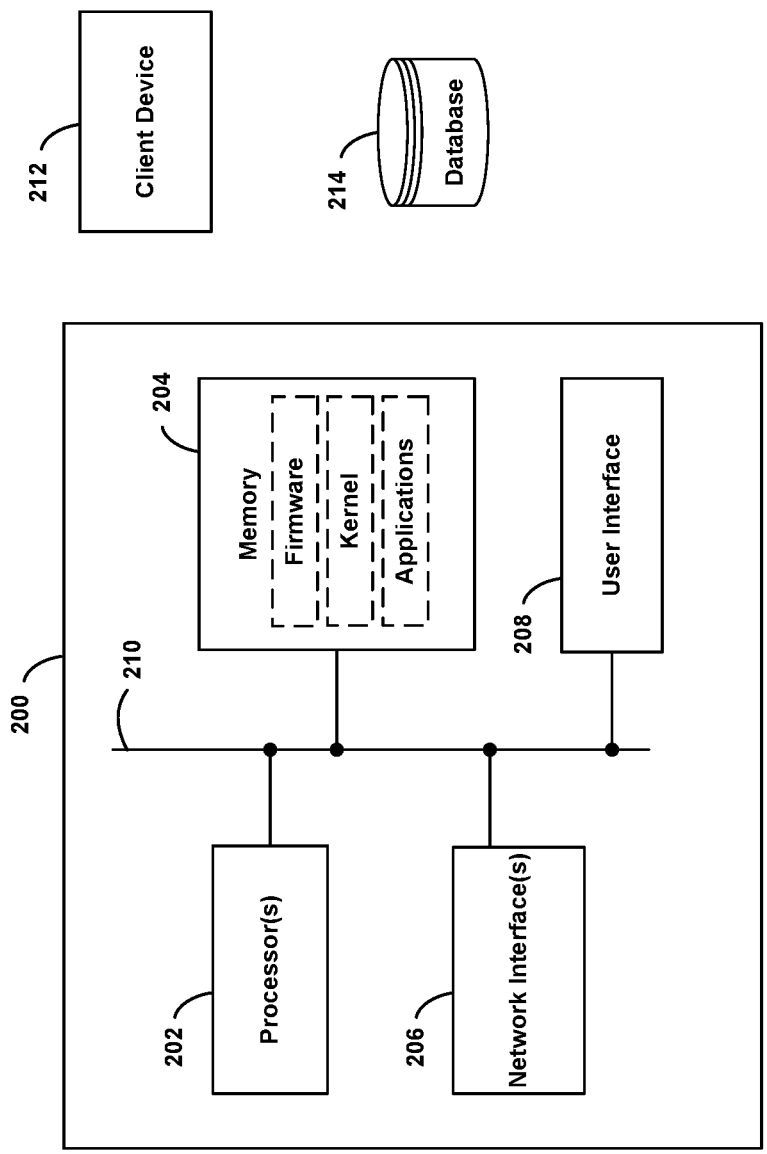
FIG. 2 is a simplified block diagram of an example computing system in which various disclosed principles can be implemented.

FIG. 2 is a simplified block diagram of an example computing system (or computing device) 200. The computing system 200 can be configured to perform and/or can perform one or more acts, such as the acts described in this disclosure. As shown, the computing device 200 may include processor(s) 202, memory 204, network interface(s) 206, and an input/output unit 208. By way of example, the components are communicatively connected by a bus 210. The bus could also provide power from a power supply (not shown).

Processors 202 may include one or more general purpose processors and/or one or more special purpose processors (e.g., digital signal processors (DSPs) or graphics processing units (GPUs). Processors 202 may be configured to execute computer-readable instructions that are contained in memory 204 and/or other instructions as described herein.

Memory 204 may include firmware, a kernel, and applications, among other forms and functions of memory. As described, the memory 204 may store machine-language instructions, such as programming code or non-transitory computer-readable storage media, that may be executed by the processor 202 in order to carry out operations that implement the methods, scenarios, and techniques as described herein. In some examples, memory 204 may be implemented using a single physical device (e.g., one magnetic or disc storage unit), while in other examples, memory 204 may be implemented using two or more physical devices. In some examples, memory 204 may include storage for one or more machine learning systems and/or one or more machine learning models as described herein.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. In one example, the communication interface 206 can be a wired interface, such as an Ethernet interface. In another example, the communication interface 206 can be a wireless interface, such as a cellular or WI-FI interface.

The user interface 208 can allow for interaction between the computing system 200 and a user of the computing system 200, if applicable. As such, the user interface 208 can include, or provide an interface connection to, input components such as a keyboard, a mouse, a touch-sensitive panel, and/or a microphone, and/or output components such as a display device (which, for example, can be combined with a touch-sensitive panel), and/or a sound speaker. In an example embodiment, the client device 212 may provide user interface functionalities.

The computing system 200 can also include one or more connection mechanisms that connect various components within the computing system 200. For example, the computing system 200 can include a connection mechanism 210 that connects components of the computing system 200, as shown in FIG. 2.

Network interface(s) 206 may provide network connectivity to the computing system 200, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

Client device 212 may be a user client or terminal that includes an interactive display, such as a GUI. Client device 212 may be used for user access to programs, applications, and data of the computing device 200. For example, a GUI could be used for graphical interaction with programs and applications described herein. In some configurations, the client device 212 may itself be a computing device; in other configurations, the computing device 200 may incorporate, or be configured to operate as, a client device.

Database 214 may include storage for input and/or output data, such pre-recorded media content, such as video content that may be downloaded, broadcast, or streamed, for example. A database of pre-recorded video media content could serve as a corpus of training video content, as mentioned above, and described in more detail below.

In some configurations, the computing system 200 can include one or more of the above-described components and can be arranged in various ways. For example, the computer system 200 can be configured as a server and/or a client (or perhaps a cluster of servers and/or a cluster of clients) operating in one or more server-client type arrangements, for instance.

III. Example Operations

A. Example Video Frame Organization and Video Graph Generation

Figure 3:
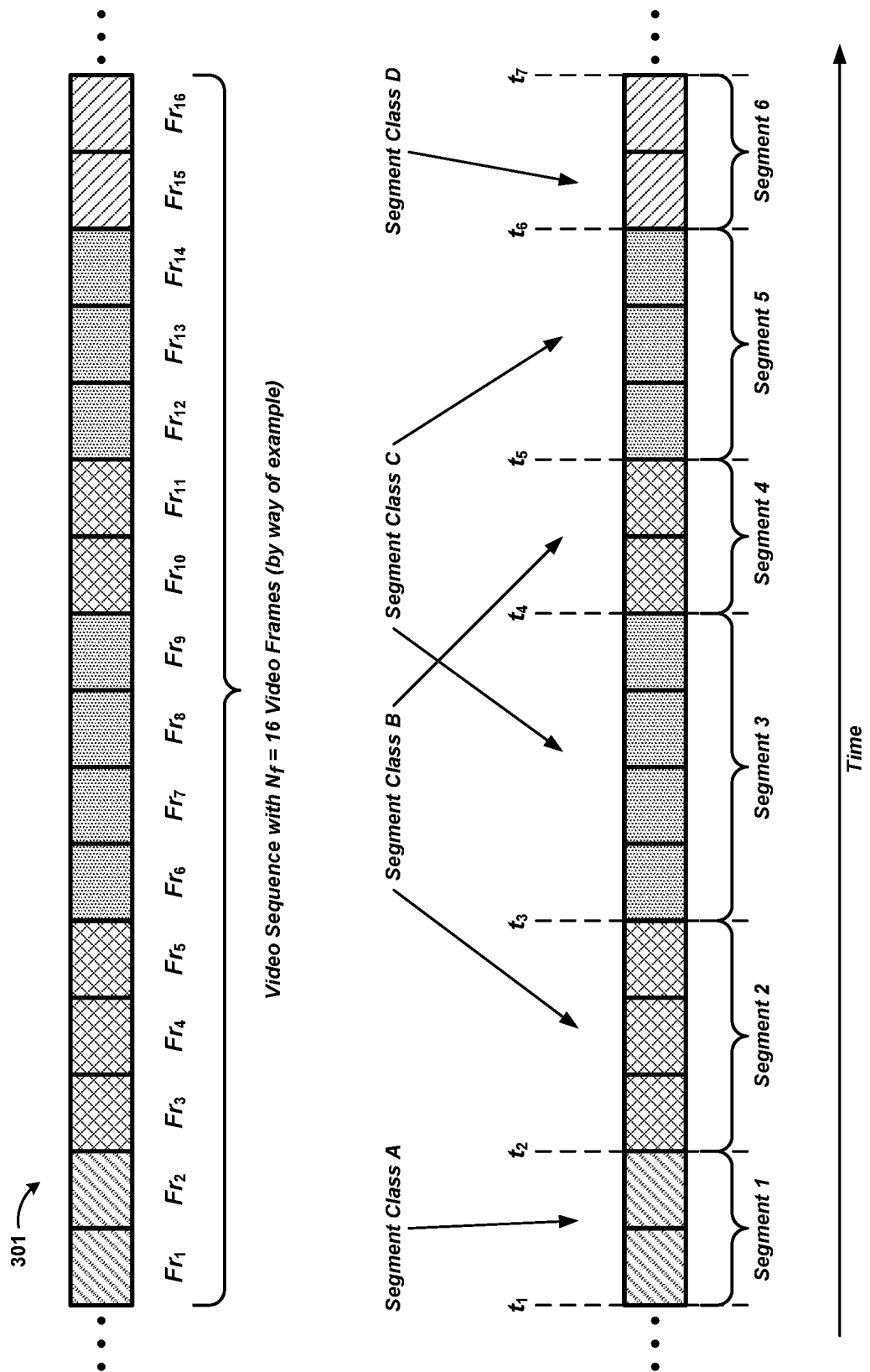
FIG. 3 illustrates an example sequence of video frames, in accordance with example embodiments.

FIG. 3 illustrates an example sequence 301 of video frames, in accordance with example embodiments. A top panel of FIG. 3 shows $N_f = 16$ video frames $Fr_j$, $j = 1, ..., 16$ of sequence 301, labeled $Fr_1$, $Fr_2$, ..., $Fr_{16}$. In a typical application in which the video sequence corresponds to a streaming TV program or movie, the entire sequence would contain many more frames — e.g., several thousand — so the sequence 301 may be considered as just a portion of an entire sequence for illustrative purposes. This is represented by the ellipses to the left and right of sequence 301. An arrow labeled "Time" at the bottom of FIG. 3 indicates that time increases to the right, such that video frames with higher numbers occur later in time in the sequence.

For convenience in the discussion, each of the video frames is depicted with one of four fill patterns that represent four example segment classes. Video segments are represented by contiguous groupings of video frames of the same fill pattern. This is shown in more detail in a bottom panel of FIG. 3 in which six segments labeled "Segment 1," "Segment 2," ..., "Segment 6" are demarked by time instances $t_1$, $t_2$, ..., $t_7$. Specifically, in the example shown, Segment 1 spans $t_1 - t_2$, includes $Fr_1 - Fr_2$, and corresponds to Segment Class A. In line with the discussion above, then, $Fr_1$ and $Fr_2$ may be considered as containing contextually-related subject content that in this example is associated with Segment Class A. Similarly, Segment 2 spans $t_2 - t_3$, includes $Fr_3 - Fr_5$, and corresponds to Segment Class B; Segment 3 spans $t_3 - t_4$, includes $Fr_6 - Fr_9$, and corresponds to Segment Class C; Segment 3 spans $t_3 - t_4$, includes $Fr_6 - Fr_9$, and corresponds to Segment Class C; Segment 3 spans $t_3 - t_4$, includes $Fr_6 - Fr_9$, and corresponds to Segment Class C; Segment 4 spans $t_4 - t_5$, includes $Fr_{10} - Fr_{11}$, and corresponds to Segment Class B; Segment 5 spans $t_5 - t_6$, includes $Fr_{12} - Fr_{14}$, and corresponds to Segment Class C; and Segment 6 spans $t_6 - t_7$, includes $Fr_{15} - Fr_{16}$, and corresponds to Segment Class D.

Note that Segments 2 and 4 are both associated with Segment Class B, and Segments 3 and 5 are both associated with Segment Class C. This illustrates how segments that are not consecutive, but separated in time may contain or be associated with contextually-related subject matter as indicated by their common segment class. Example embodiments of automated video segmentation can thus not only identify which frames belong to specific video segments, but also which non-contiguous segments are related by virtue of the subject content contained. During training, this segmentation information may be associated with each frame with a label indicating segment membership and segment class. As described above, this information may be part of metadata associated with each video frame.

As described in connection with both training and runtime operation of the automated video segmentation system 100 of FIG. 1, the media processing and graph generation module 102 generates a training or runtime video graph from an input sequence of video frames. In accordance with example embodiments, media processing may involve frame-by-frame feature extraction that is used in the video graph generation. Both aspects are now described in connection with FIGS. 4 and 5.

Figure 4:
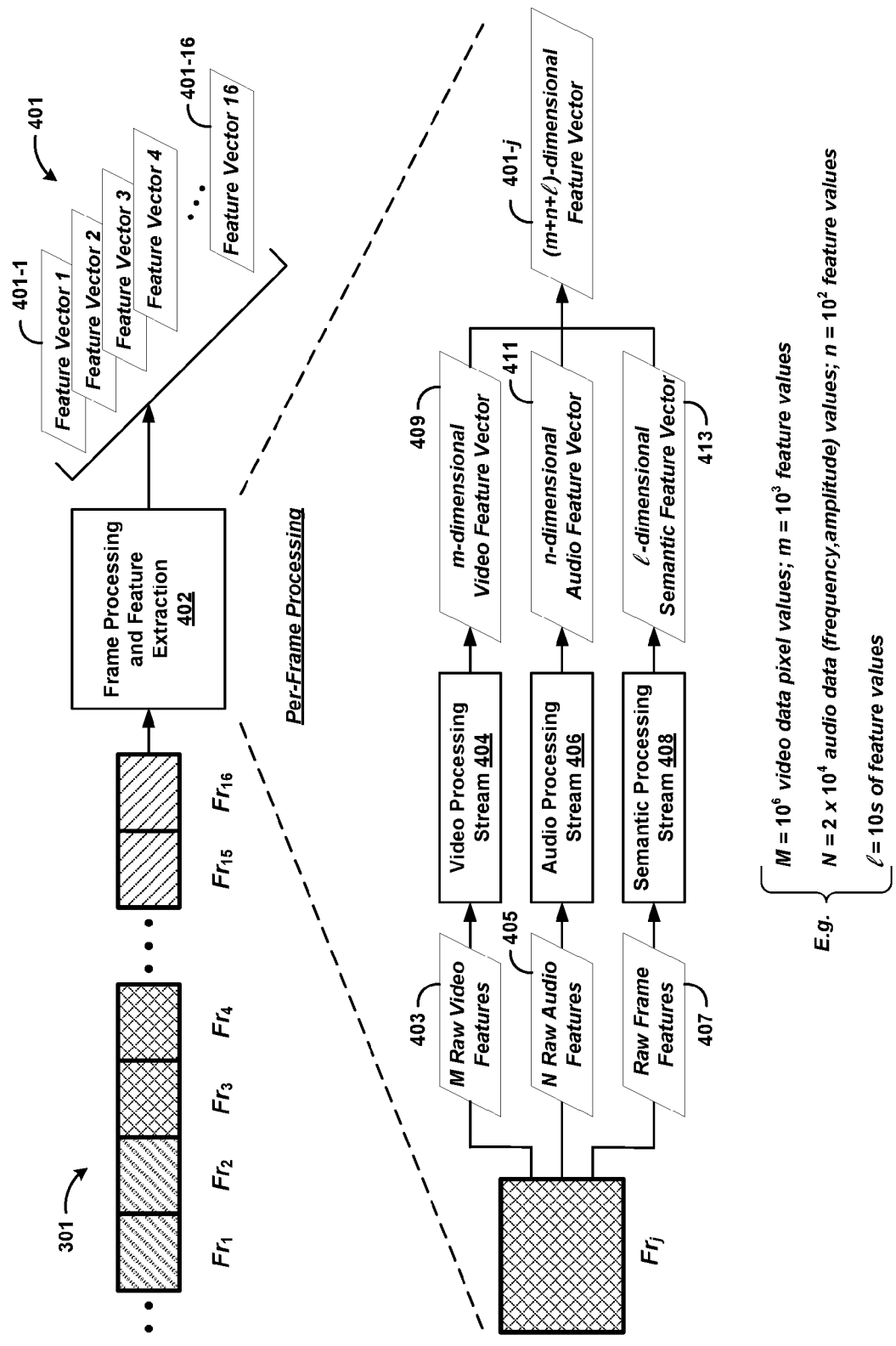
FIG. 4 illustrates example processing and feature extraction of video frames, in accordance with example embodiments.

FIG. 4 illustrates example media processing and feature extraction of video frames. In accordance with example embodiments, this may be carried out by a frame processing and feature extraction module 402. As shown, the video frame sequence 301 is input to the frame processing and feature extraction module 402, which may carry out per-frame processing in three parallel processing pipelines or streams, and output a sequence 401 of feature vectors 401-$j$, $j = 1, ..., N_f$. Each feature vector 401-$j$ corresponds to one of the frames $Fr_j$. More particularly, each video frame of a sequence may be include M raw (unprocessed) video features 403 and N raw audio features 405, as well as possibly metadata (where N should not be confused with $N_f$). For example, raw video features may correspond to individual pixel values, while raw audio features may correspond to frequency-amplitude values. By way of example, each video frame may include an $M = 10^3 \times 10^3 = 10^6$ array of pixel values and an $N = 2 \times 10^4$ element vector of frequency-amplitude values. Other configurations are possible as well.

As shown, a video processing stream 404 may analyze the M raw video features 403 and map them to a smaller m-dimensional video feature vector 409, which may be expressed as $x = (x_1, x_2, ..., x_m)$. For example, the video analysis and mapping may produce an $m = 10^3$ valued video feature vector 109. Similarly, the processing stream 406 may analyze the N raw video features 405 and map them to a smaller n-dimensional video feature vector 409, which may be expressed as $a = (a_1, a_2, ..., a_n)$. For example, the audio analysis and mapping may produce an $n = 10^2$ valued audio feature vector 109. Raw features 407 may also be processed in a semantic processing stream 408 to map them to a smaller ℓ-dimensional semantic feature vector 413, which may be expressed $s = (s_1, s_2, ..., s_\ell)$. Semantic features may include such higher-level structures as faces, persons, cars, or other objects, for example. The three smaller feature vectors 409, 411, and 413 may then be aggregated into a per-frame $(m + n + \ell)$-dimensional feature vector 401-$j$, as shown.

The analysis and mapping of the raw features to more compact feature vectors is sometimes referred to as feature extraction, and may be achieved using various known and/or future analytical techniques. In some example embodiments, M raw video features may be statistically analyzed in the video processing stream 404 to generate m < M video feature vectors that characterize spatial-statistical distributions of brightness, intensity, saturation, and/or other derived, aggregate properties of the raw features. In other example embodiments, the video processing stream 404 may utilize ML-based methods involving ANNs or other ML models trained to recognize high-level structural and/or aggregate features in the raw features. Statistical and/or ML-based techniques may similarly be applied in the audio processing stream 406 to produce the n-dimensional audio feature vectors from the N > n raw audio features. These techniques may also be applied in the semantic processing stream 408, as well.

Figure 5:
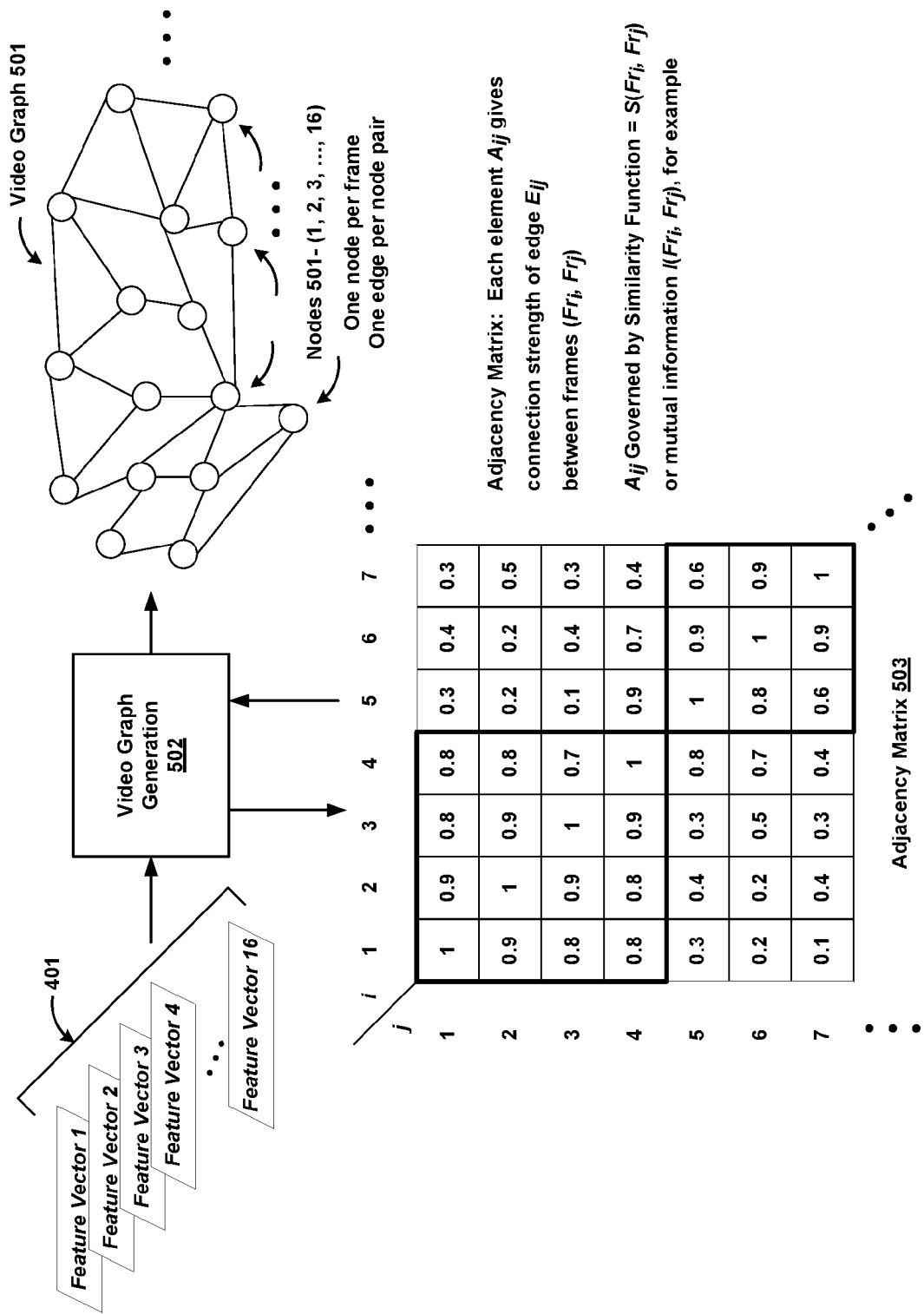
FIG. 5 illustrates example video graph generation, in accordance with example embodiments.

The feature vectors 401 produced by frame processing and feature extraction 402 form input to video graph generation, illustrated by way of example in FIG. 5. Specifically, the feature vectors 401 may be input to video graph generation 502, which creates an $N_f \times N_f$ adjacency matrix A 503. Each row in A is labeled in correspondence with one of the frames $Fr_j$, and each column is labeled in correspondence with one of the frames $Fr_i$. For the sake of brevity in FIG. 5, only the first seven rows and columns are shown. Each element $A_{ij}$ of A corresponds to a connection strength between the pair of video frames $Fr_i$ and $Fr_j$. More particularly, the connection strength may be governed by a similarity metric of the two frames $Fr_i$ and $Fr_j$ as measured by their respective feature vectors 401-$i$ and 401-$j$. In an example embodiment, the similarity metric may be computed as a cosine similarity (e.g., an inner product) or a mutual information function of the two feature vectors. Other forms of similarity metric are possible as well.

To the extent that each feature vector 401-$j$ characterizes video, audio, and semantic content of the corresponding video frame $Fr_j$, the similarity metric of any pair of feature vectors can provide a measure of the similarity of the video, audio, and semantic content of any pair of frames $Fr_i$ and $Fr_j$. It may be expected that any pair of video frames belonging to the same video segment and/or belonging to video segments of the same segment class will generally have a high similarity metric. Conversely, those belonging to different video segments and/or belonging to video segments of the different segment classes will generally have a low similarity metric.

In an example embodiment, the connection strength may be expressed as a fractional value between zero and one (0 and 1), where zero represents no connection and one represents complete (maximum) connection. As shown, the diagonal values of A are all equal to one, since these correspond to self-connection of each frame. The off-diagonal values of A correspond to more and more widely separated video frames in the video sequence. Conventional applications of adjacency matrices, such as A 503, generally restrict consideration to temporally nearby pairs of frames. This is represented by the two diagonal squares in A 503 delineated in thick black lines. However, this approach tends to overlook or ignore potential similarities of non-consecutive, possibly widely separated, video segments of the same class. One advantage of example embodiments herein is that by considering all pairs of video frames across a sequence, similarities due to common segment classes of otherwise non-consecutive segments may be identified, thereby enabling a more global or complete analysis of entire media content programs (TV programs, movies, etc.) than more locally-focused techniques support.

Once the adjacency matrix A 503 is constructed, video graph generation may use it as input to generate a video graph 501. As shown, the video graph 501 is made up of nodes 501-(1, 2, ..., 16), each pair of nodes being connected by edges (lines). Each node corresponds to a video frame, and each edge corresponds to the temporal distance between the connected pair of nodes weighted by the connection strength $A_{ij}$. In practice, the video graph may be fully connected, with an edge between every pair of nodes. However, for the sake of brevity in FIG. 5, not all edges are shown. Also, as generated by video graph generation 502, the nodes are not labeled. That is, video graph generation does not necessarily associate labels of the video frames with the corresponding nodes of the video graph. As described below, the video graph may be labeled in the training operation in order to support training of the automated video segmentation system 100.

In accordance with example embodiments, the ability to consider all pairs of frames across an entire video frame sequence can be made computationally practical and scalable by training and using a GNN to map the nodes of the video graph to associated embeddings, and analytically determining clustering of nodes using the embeddings. The embeddings can then be applied to various video analysis tasks, including, but not limited to, video segmentation. For example, the embeddings generated from a video graph may be applied to identification of scenes and/or shots of a movie, identification of genres and themes of media programs, and other higher-level characterizations of media content in a sequence of video frames.

Before describing generation of embeddings and video segmentation from them, an example ANN is described. While this summary description is fairly general, some of the concepts may be useful as context for the ML-based techniques applied to GNNs and task-oriented ANNs in the subsequent sections of the current disclosure.

B. Example Artificial Neural Network

As described above, an automated video segmentation system may use one or more ANNs to perform such tasks as feature extraction, generation of embeddings from video graphs, and label and clustering nodes from embeddings. At runtime, the trained model may be applied to one or more video sequences, such as TV programs or movies, to carry out these tasks. In accordance with example embodiments, an ANN may be trained to extract features, generate embeddings, and/or predict labels and clusters.

Figure 6:
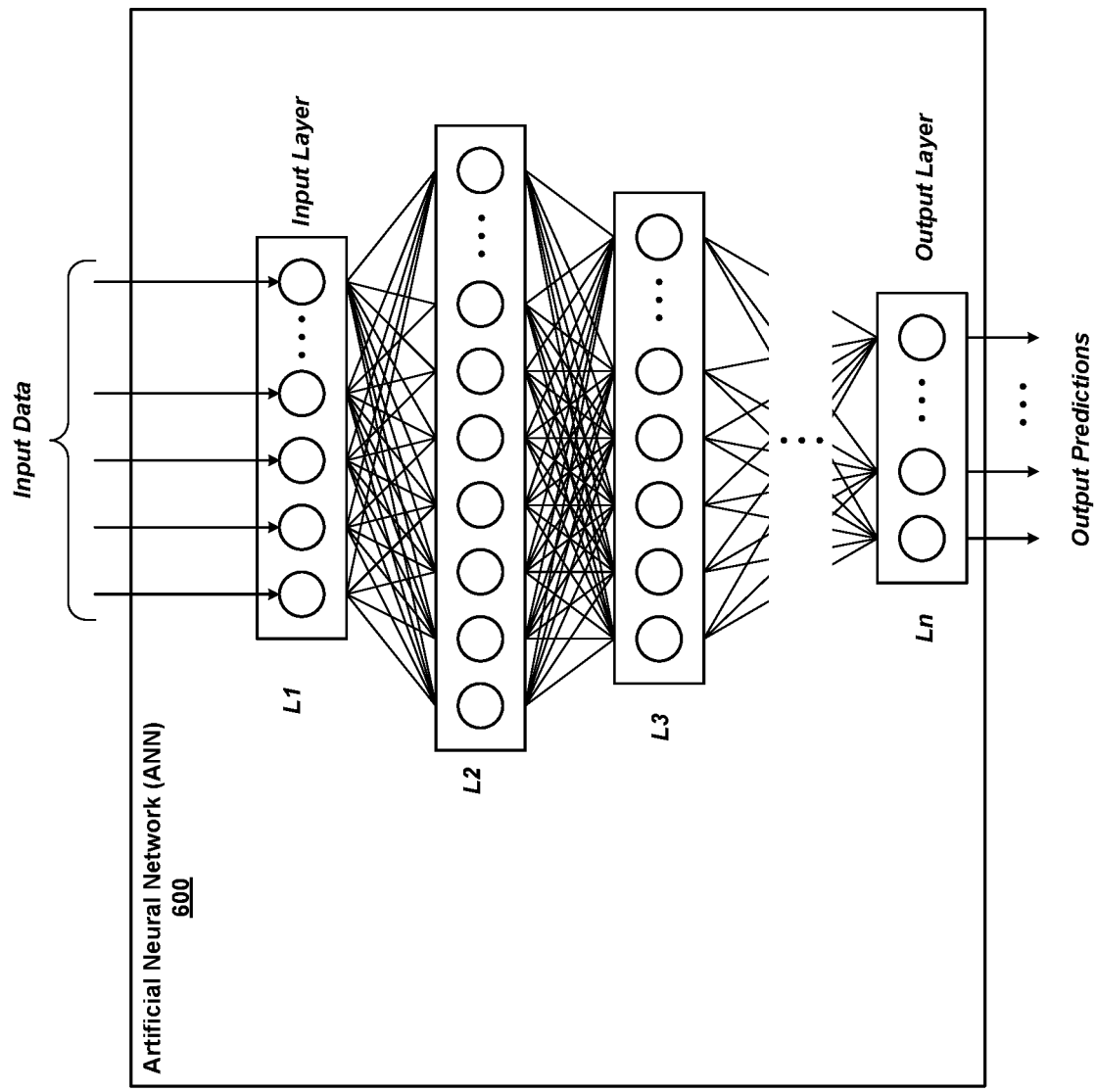
FIG. 6 is an example architecture of an example artificial neural network, in accordance with example embodiments.

FIG. 6 illustrates an example architecture of an example artificial neural network 600, in accordance with example embodiments. As shown, the ANN 600 may be computationally constructed as a plurality of interconnected layers, including an input layer, labeled "L1"; an output layer, labeled "Ln"; and one or more intermediate layers, labeled "L2" and "L3" in this example. The ellipses between L3 and Ln represent one or more possible intermediate layers. In this example, there are n layers, with Ln labeling the nth layer. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data, for example, may involve inputting training data that represents known or ground-truth (training) examples of the particular class of content for which results are known, and then adjusting parameters (or weights) of the nodes in an ANN learning update procedure, such as back propagation, to maximize a probability that a predicted output by the ANN output (e.g., what the ANN "thinks" the input data represents) matches the training examples.

For some types of applications in which an ANN is used, it may be configured to predict a probability or probabilities that a given input matches one or more elements or classes of elements of a known discrete set of elements or classes of elements. In this context, the ANN or the system in which it is implemented may be referred to as a "classifier," signifying a classification operation. A classifier may also be configured to make an actual selection from among a known discrete set of elements or classes of elements. For other types of applications in which an ANN is used, it may be configured to compute, given an input, a probable continuous value (e.g., a scalar) or set of values (e.g., a vector) as output, possibly together with confidence levels for the predicted output(s). In this context, the ANN or the system in which it is implemented may be considered as performing one or another form of regression analysis. Example embodiments of ML predictors described herein may include or employ either or both types of ANN implementations, in accordance with the descriptions below. Further, other types of ANNs are possible, and may be used or included in example embodiments of ML predictors described herein.

C. Example Training and Runtime Operation

Figure 7:
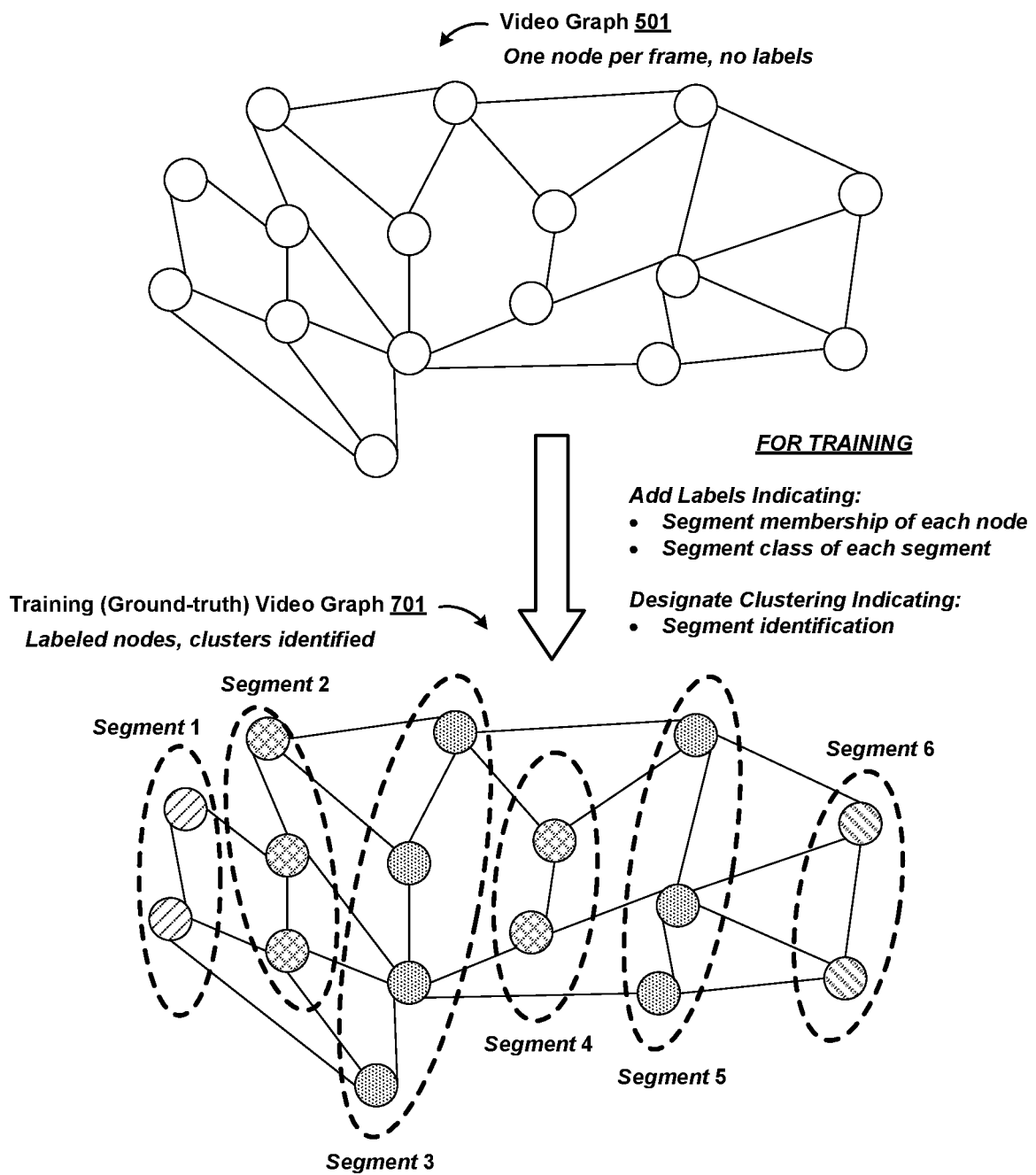
FIG. 7 is a conceptual illustration relating an unlabeled example video graph to a corresponding labeled, ground-truth video graph for training, in accordance with example embodiments.

FIG. 7 is a conceptual illustration relating an unlabeled example video graph to a corresponding labeled, ground-truth video graph for training, in accordance with example embodiments. The top panel of the figure shows the video graph 501, as generated without node labels. That is, the video graph generated without any a priori knowledge of known labels or segments. During training operation, however, video sequences with known segmentation are used. More particularly, a training video sequence is one for which segments have previously been identified by one technique or another (e.g., manual curation by a human editor). Thus, the training video frames of a training video sequence are each labeled with an identification of which training video segment they belong to, as well as the segment class of the training video segment. The labels allow the video graph to be labeled accordingly, and thus serve as a ground-truth video graph for training purposes.

The bottom panel of the figure shows a labeled video graph 701, which corresponds to a version of the video graph 501 that includes known labels of the video frames that correspond to the nodes of the video graph 701. In the figure, the labels are represented by the fill patterns described in connection with FIG. 3, but, for the sake of brevity, no explicit frame numbers are shown. The video graph 701 also depicts clusterings of the nodes according to the known video segments, represented by dashed ovals encircling the nodes of the known clusters. As shown, each cluster is labeled according to the training video segment that corresponds to the cluster. Comparison of the training video graph 701 with the bottom panel of FIG. 3 shows that, ignoring the omission of explicit frame number in the nodes, the fill pattern and number of nodes in each labeled cluster of training video graph 701 matches the fill pattern and the number of frames in each labeled segment of video frame sequence 301. Put another way, the training video graph 701 is a ground-truth video graph: one that would be expected to be predicted by a perfectly-trained automated video segmentation system.

To summarize, a training video graph 701 may be considered as one obtained from an unlabeled video graph by adding node labels that specify both the known segments that the corresponding training video frames belong to, as well as the segment classes of the known training video segments. In addition, the clustering of the nodes according to known sub-sequences of training video frames in the training video segments may also be included in information associated with the training video graph. The term ground-truth video graph is also used herein to refer to a training video graph.

Figure 8:
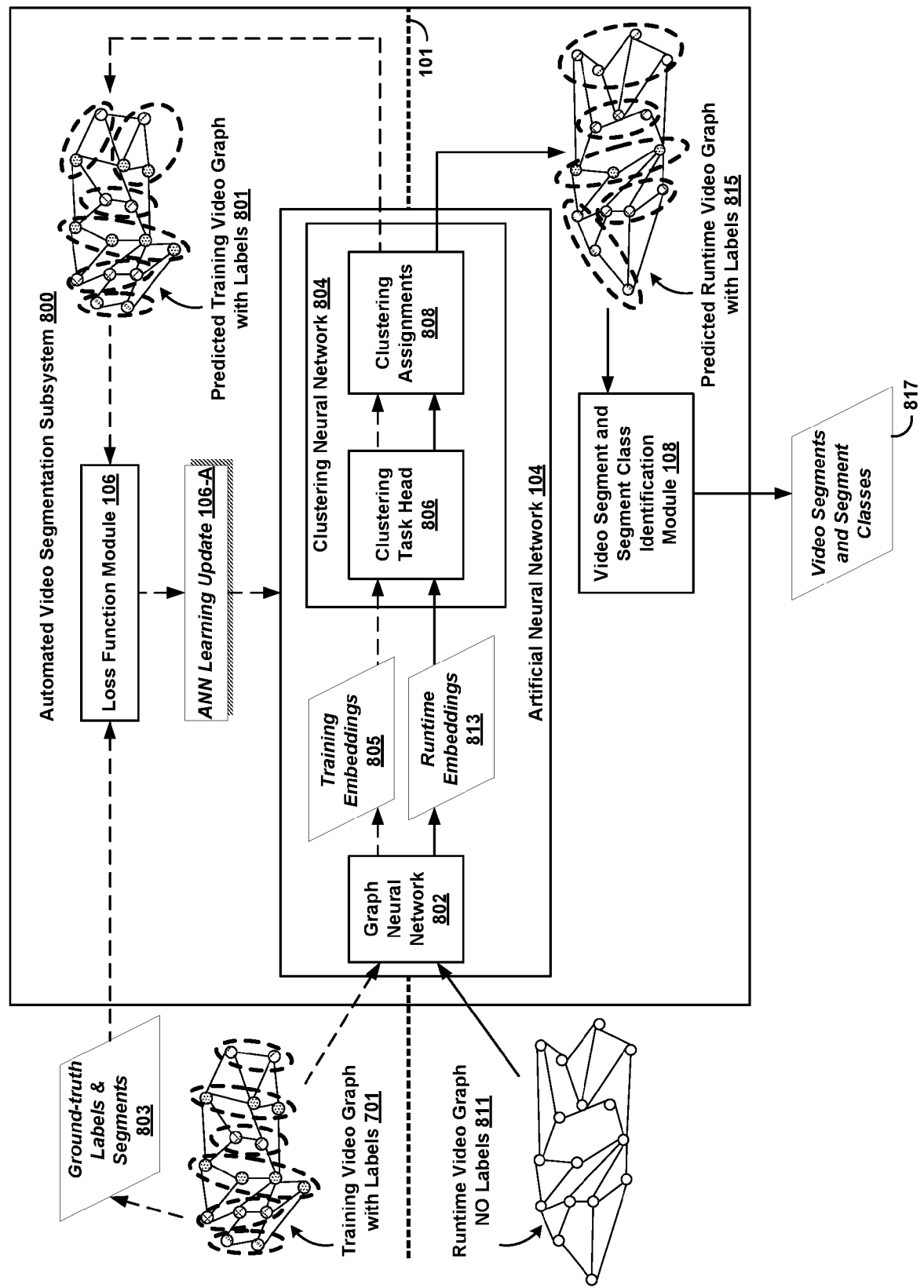
FIG. 8 is an example block diagram of a video segmentation subsystem illustrating certain operational aspects, in accordance with example embodiments.

FIG. 8 is an example block diagram of a video segmentation subsystem 800 illustrating example training and runtime operation, in accordance with example embodiments. As shown, the video segmentation subsystem 800 may include a graph neural network (GNN) 802, a clustering neural network 804, as well as the loss-function module 106, ANN learning update operation 106-A, and video segment and segment class identification module 108 of the video segmentation system 100 of FIG. 1. As such, the video segmentation subsystem 800 may be considered a subsystem of video segmentation system 100. As also shown, the clustering neural network 804 includes a clustering task head and a clustering assignments module or function. As in FIG. 1, the dashed line 101 designates a conceptual separation between training and runtime operations, with training operations shown above line 101 and runtime operations shown below. Operations that sit on top of the line are generally common to both training and runtime.

During training operation, a training (ground-truth) video graph 701 may be input to or received by the GNN 802, which generates training embeddings 805. In accordance with example embodiments, the training video graph 701 may be generated from a training video sequence in a manner such as that described in connection with FIGS. 4, 5, and 7, for example. As also described, the training embeddings 805 may take the form of a mapping of features vectors associated with the nodes of the training video graph to a smaller dimensional representational space. Generation of embeddings from a video graph by a GNN may be carried out according to known techniques and/or future-developed techniques. A GNN may be trained to generate the embeddings as a distinct task, or may learn the embeddings in the context of overall training of an automated, ANN-based video segmentation system, for example.

The training embeddings 805 may be input to the cluster head task 806 and the clustering assignments operation 808, which may then generate predicted labels for the nodes of the training video graph, and predicted clustering of the nodes of the video graph. In accordance with example embodiments, the output of the clustering neural network 804, which is produced by the cluster head task 806 and the clustering assignments operation 808, is a predicted training video graph 801 with predicted labels and predicted cluster assignments. For purposes of illustration, the predicted training video graph 801 is shown to deviate from the training video graph 701. The deviation is a conceptual representation of imperfect predictions of the GNN 802 and/or the clustering NN 804 that might be expected during training operations, at least during initial phases. As training progresses, it may be expected that the predictions will improve.

Continuing with training operations, ground-truth labels and segments 803, which may be derived or determined from the training video graph 701, may be input to the loss function module 106. At the same time, the predicted training video graph 801 is also input to the loss function 106. The differences between the predicted training video graph 801 and the training video graph 701, quantified by the loss function 106, may be applied in the ANN learning update operation 106 in a process that adjusts parameters of the GNN 802 and/or the clustering NN 804 in order to improve the accuracy of the predictions. This process may be carried out iteratively for each of multiple training video graphs, each generated from one of multiple training video sequences. Training may typically be carried out until the agreement between predicted training video graphs agree with the input training (ground-truth) video graphs to within a specified statistical level of confidence, for example. In an example embodiment an ANN learning update process could be back-propagation, in accordance with known techniques. However, other techniques for updating ANN learning, either known or developed in the future, could be used.

Once the automated video segmentation system 100 (and subsystem 800) is trained, it may be applied in runtime operations to runtime video sequences. This is shown conceptually below the line 101. As used herein, a runtime video sequence may be considered one not seen by the automated video segmentation system 100 prior to training. The term "unseen" may also be used instead of "runtime" for this purpose.

During runtime operation, a runtime video graph 811 may be input to or received by the GNN 802, which generates runtime embeddings 813. In accordance with example embodiments, the runtime video graph may be generated from a runtime video sequence in a manner such as that described in connection with FIGS. 4, 5, and 7, for example. The runtime embeddings 813 may take the form of a mapping of features vectors associated with the nodes of the runtime video graph to a smaller dimensional representational space.

The runtime embeddings 813 may be input to the cluster head task 806 and the clustering assignments operation 808, which may then generate predicted labels for the nodes of the runtime video graph, and predicted clustering of the nodes of the runtime video graph. In accordance with example embodiments, the output of the clustering neural network 804, which is produced by the cluster head task 806 and the clustering assignments operation 808, is a predicted runtime video graph 815 with predicted labels and predicted cluster assignments. Since the predicted runtime video graph 815 is the output of a trained system, it may be expected to represent accurate predictions.

The predicted runtime video graph 815 may then be input to the video segment and segment class identification module 108, which outputs the video segments and segment classes 817, which represent the output of the automated video segmentation system 100. In accordance with example embodiments, the video segments and segment classes 817 for any given input runtime video sequence may be recorded in a database or the like, input to an external device or program interface for further evaluation or processing, displayed on a display device, and/or printed as hardcopy. For example the video segments and segment classes 817 could be used in offline processing of recorded TV shows, movies, or the like, in order to create metadata for each frame that includes the predicted labels, as described above. Other uses are possible as well.

An automated video segmentation system may also be used in real time to generate the video segments and segment classes 817 in a windowed fashion as a video sequence (e.g., TV program or movie) is streamed and/or broadcast. In this application, an initial portion of a video frame sequence may be accumulated and analyzed as described above to generate video segmentation. The portion size could be defined by a time window, for example. Then, as the broadcast or streaming continues, the window contents (i.e., video frames) could be continually updated and the updated contents analyzed in real time. Conceptually, the updating of the window contents could be described as sliding the window across the entire video frame sequence and performing automated video segmentation for each new position of the window. Other techniques for real time video segmentation using example embodiments of an automated video segmentation system may be devised as well.

It should be noted that the specific components and modules of the video segmentation subsystem as shown may be considered as examples, to some extent represent conceptual operations that may in practice be implemented differently than as described above. For example, the derivation of the ground-truth labels and segments 802 from the training video graph 701 may be carried out within the context of the GNN 802 during training. Other differences in details of implementation are possible as well.

IV. Example Methods

Figure 9:
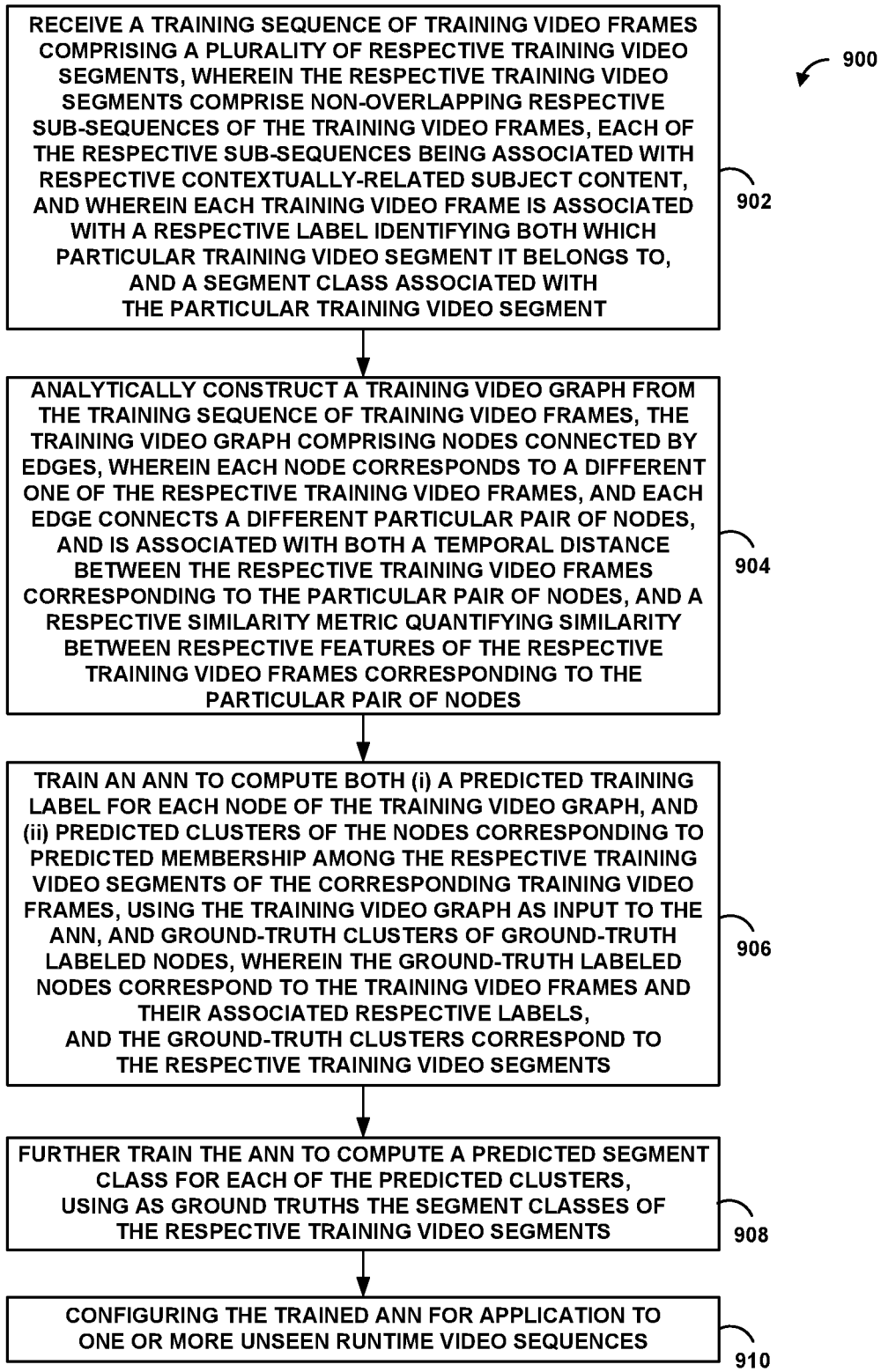
FIG. 9 is a flow chart of an example method of a video segmentation system, in accordance with example embodiments.
Figure 10:
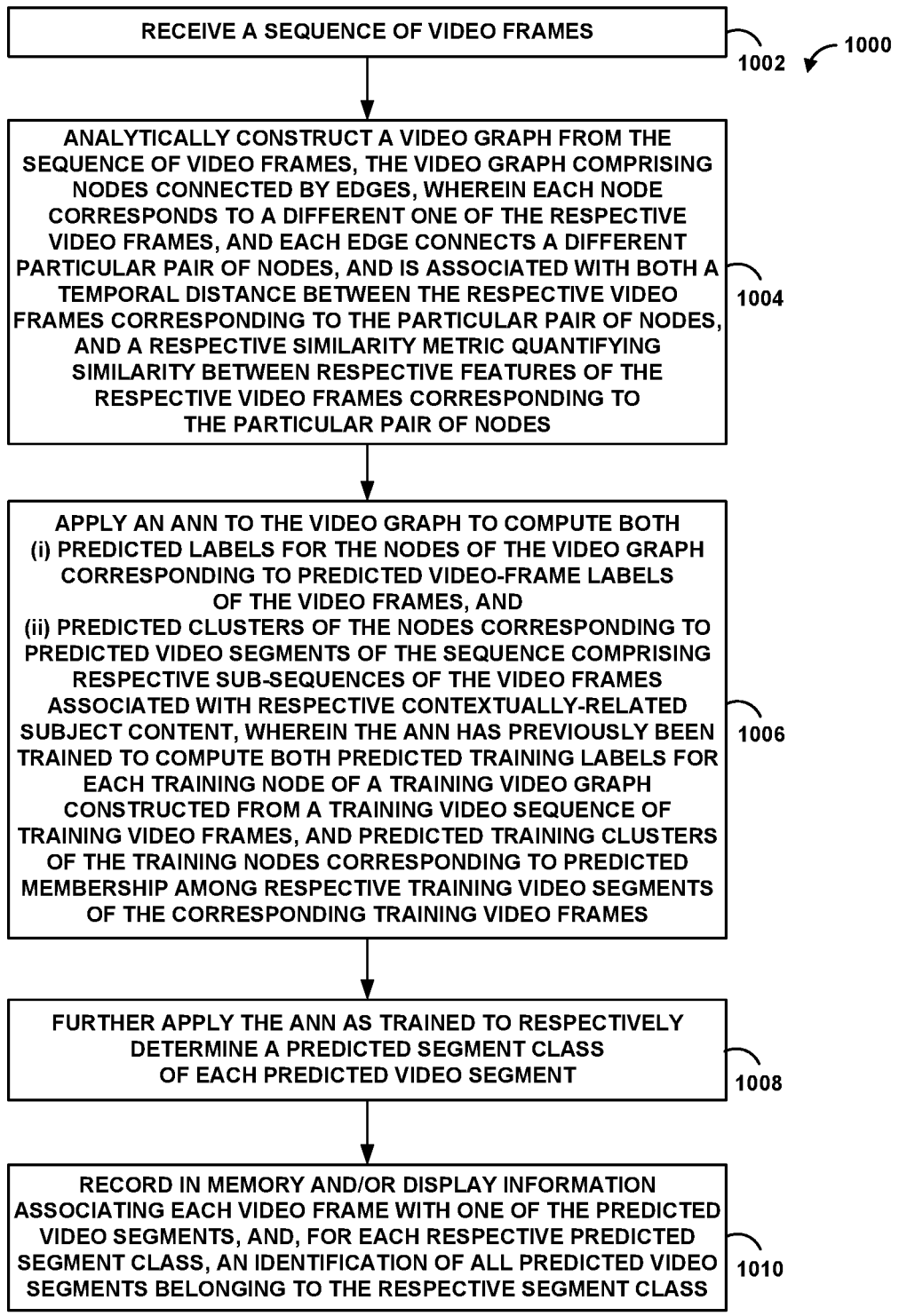
FIG. 10 is a flow chart of another example method of a video segmentation system, in accordance with example embodiments.

FIGS. 9 and 10 illustrate flow charts of example methods 900 and 1000 that may be carried out in part or in full by an automated video segmentation system, such as automated video segmentation system 100 shown in FIG. 1, or automated video segmentation subsystem 800 shown in FIG. 8. The example method 900 illustrates both training and runtime operations of an example automated video segmentation system. The example method 1000 illustrates primarily runtime operations of an example automated video segmentation system, but with training of the system, as described herein, having been carried out prior to the runtime operations.

The example methods 900 and 1000 may be implemented as computer-readable instructions stored in one or another form of memory (such as volatile or nonvolatile memory) of a computing device or system of the content-presentation device. An example of a computing system is shown in FIG. 2. When executed by one or more processors of the computing device or system, the instructions may cause the system or device or system to carry out operations of the example methods 900 and/or 1000. The computer-readable instructions may additionally be stored on a non-transitory computer readable medium, which may be used, for example, for loading the instructions into the memory of the computing system. In some examples, the non-transitory computer-readable medium could be the memory of the computing system.

Example method 900 is described first.

Block 902 may involve receiving a training sequence of training video frames comprising a plurality of respective training video segments. The respective training video segments may include non-overlapping respective subsequences of the training video frames, each of which subsequences may be associated with respective contextually-related subject content. Further, each training video frame may be associated with a respective label identifying both which particular training video segment it belongs to, and a segment class associated with the particular training video segment. In an example, a training video sequence could include one or more TV programs or movies, and training video segments could be program segments and advertisement segments with the one or more TV programs or movies.

Block 904 may involve analytically constructing a training video graph from the training sequence of training video frames. The training video graph may include nodes connected by edges. Each node may correspond to a different one of the respective training video frames, and each edge connects a different particular pair of nodes, and is associated with both a temporal distance between the respective training video frames corresponding to the particular pair of nodes, and a respective similarity metric quantifying similarity between respective features of the respective training video frames corresponding to the particular pair of nodes.

Block 906 may involve training an artificial neural network (ANN) to compute both (i) a predicted training label for each node of the training video graph, and (ii) predicted clusters of the nodes corresponding to predicted membership among the respective training video segments of the corresponding training video frames. Training may use the training video graph as input to the ANN, and ground-truth clusters of ground-truth labeled nodes. The ground-truth labeled nodes may correspond to the training video frames and their associated respective labels, and the ground-truth clusters may correspond to the respective training video segments.

Block 908 may involve further training the ANN to compute a predicted segment class for each of the predicted clusters, using as ground truths the segment classes of the respective training video segments.

Finally, block 910 may involve configuring the trained ANN for application to one or more unseen runtime video sequences. By way of example, the configuring may involve storing or recording parameters of the trained ANN for use in applying the trained ANN to the unseen runtime video sequences. Configuring may additionally or alternatively involve recording and/or displaying on a display device training status information indicating that training has been successfully achieved, for example.

In accordance with example embodiments, example method 900 may further involve receiving a runtime sequence of runtime video frames. The runtime video frames may be unlabeled with respect to both any video segment of the runtime sequence and any segment class. A further operation may involve analytically constructing a runtime video graph from the runtime sequence of runtime video frames. The runtime video graph may include runtime nodes connected by runtime edges. Each runtime node may correspond to a different one of the respective runtime video frames, and each runtime edge connects a different particular pair of runtime nodes, and is associated with both a temporal distance between the respective runtime video frames corresponding to the particular pair of runtime nodes, and a respective runtime similarity metric quantifying similarity between respective features of the respective runtime video frames corresponding to the particular pair of runtime nodes. A still further operation may involve applying the trained ANN to the runtime video graph to compute both (i) a predicted runtime label for each runtime node of the runtime video graph and (ii) predicted runtime clusters of the runtime nodes, and then further applying the trained ANN to respectively determine both a predicted runtime video segment associated with each predicted runtime cluster, and a predicted runtime segment class of each predicted runtime video segment. Finally, an additional operation may involve recording in memory and/or displaying segmentation information. The segmentation information may be based on the predicted runtime labels, the predicted runtime video segments, and the predicted runtime segment classes, and may include (i) an identification of the predicted runtime video segments, (ii) an association of each respective runtime video frame with one of the predicted runtime video segments, and (iii) for each respective predicted runtime segment class, an identification of all predicted runtime video segments belonging to the respective runtime segment class.

In accordance with example embodiments, the training sequence may further include one or more program-sequences, each corresponding to a respective content program, and each including a respective sub-plurality of the plurality of training video segments. For example each program-sequence may be a movie or TV program. The respective contextually-related subject content may be a media content category. Non-limiting examples of a media content category may be one or more of regular program content, advertising content, program scene content, or thematic program content. With this arrangement, analytically constructing the training video graph may involve constructing a respective program-content video graph for each of the one or more program-sequences. Additionally, training the ANN may involve respectively training the ANN for each respective program-content video graph, and further training the ANN may involve further training the ANN for each respective program-content video graph.

In accordance with example embodiments, analytically constructing the training video graph from the training sequence of training video frames may involve extracting from each respective training video frame the respective label, timing information indicating temporal position in the training sequence, and a respective training feature vector characterizing media data of the respective training video frame. Analytically constructing the training video graph may also involve creating a respective training node associated with each respective training video frame and its respective training feature vector and timing information, and labeled with the respective label of the associated training video frame. Then, for every respective pair of created training nodes, a connecting edge may be determined. The connection edge may have a length corresponding to a temporal distance between the pair of training video frames associated with respective pair of training nodes, and a weight corresponding to a similarity metric of the respective training feature vectors of the pair of training video frames associated with the respective pair of training nodes.

In further accordance with example embodiments, the ANN may include a graph neural network (GNN) and a clustering ANN. With this arrangement, training the ANN to compute both (i) the predicted training labels for each node of the training video graph and (ii) the predicted clusters of the nodes corresponding to predicted membership among the respective training video segments of the corresponding training video frames may involve training the GNN to predict a respective embedding training vector for each respective node of the training video graph, where the respective embedding training vector corresponds to a reduced-dimension mapping of the respective training feature vector associated with the respective node. Then, the respective embedding training vectors may be used as input to train the clustering ANN to predict clusters of the nodes corresponding to the ground-truth clusters, and to predict node labels corresponding to the respective labels of the training video frames.

In further accordance with example embodiments, operations may additionally include receiving a runtime sequence of runtime video frames. The runtime video frames may be unlabeled with respect to both any video segment of the runtime sequence and any segment class. A further operation may involve analytically constructing a runtime video graph from the runtime sequence of runtime video frames. The runtime video graph may include runtime nodes connected by runtime edges. Each runtime node may correspond to a different one of the respective runtime video frames, and each runtime edge connects a different particular pair of runtime nodes, and is associated with both a temporal distance between the respective runtime video frames corresponding to the particular pair of runtime nodes, and a respective runtime similarity metric quantifying similarity between respective features of the respective runtime video frames corresponding to the particular pair of runtime nodes. A still further operation may involve applying the trained ANN to the runtime video graph to compute both (i) a predicted runtime label for each runtime node of the runtime video graph and (ii) predicted runtime clusters of the runtime nodes, and then further applying the trained ANN to respectively determine both a predicted runtime video segment associated with each predicted runtime cluster, and a predicted runtime segment class of each predicted runtime video segment. Finally, an additional operation may include recording in memory and/or displaying segmentation information. The segmentation information may be based on the predicted runtime labels, the predicted runtime video segments, and the predicted runtime segment classes, and may include (i) an identification of the predicted runtime video segments, (ii) an association of each respective runtime video frame with one of the predicted runtime video segments, and (iii) for each respective predicted runtime segment class, an identification of all predicted runtime video segments belonging to the respective runtime segment class.

In further accordance with example embodiments, analytically constructing the runtime video graph from the runtime sequence of runtime video frames may involve further operations. One operation involves extracting from each respective runtime video frame timing information indicating temporal position in the runtime sequence, and a respective runtime feature vector characterizing media data of the respective runtime video frame. Another operation involves creating a respective runtime node associated with each respective runtime video frame and its respective runtime feature vector and timing information. Then, for every respective pair of created runtime nodes, a connecting edge may be determined. The connecting edge may have a length corresponding to a temporal distance between the pair of runtime video frames associated with respective pair of runtime nodes, and a weight corresponding to a similarity metric of the respective runtime feature vectors of the pair of runtime video frames associated with the respective pair of runtime nodes.

In still further accordance with example embodiments, applying the trained ANN to the runtime video graph to compute both (i) the predicted runtime label for each runtime node of the runtime video graph and (ii) the predicted runtime clusters of the runtime nodes may involve applying the trained GNN to the runtime video graph to predict a respective embedding runtime vector for each respective runtime node of the runtime video graph, and then applying the trained clustering ANN to the respective embedding runtime vectors to predict clusters of the runtime nodes, and to predict node labels corresponding to the respective runtime labels of the runtime video frames.

In accordance with example embodiments, further applying the trained ANN to respectively determine both the predicted runtime video segment associated with each predicted runtime cluster, and the predicted runtime segment class of each predicted runtime video segment may involve applying the trained clustering ANN to both the predicted clusters of the runtime nodes and the predicted node labels in order to predict the runtime video segment associated with each predicted runtime cluster, and to predict the runtime segment class of each predicted runtime video segment.

Example method 1000 is described next.

Block 1002 may involve receiving a sequence of video frames. Non-limiting examples of a runtime video sequence could include TV programs or movies.

Block 1004 may involve analytically constructing a video graph from the sequence of video frames. The video graph may include nodes connected by edges. Each node may correspond to a different one of the respective video frames, and each edge connects a different particular pair of nodes, and is associated with both a temporal distance between the respective video frames corresponding to the particular pair of nodes, and a respective similarity metric quantifying similarity between respective features of the respective video frames corresponding to the particular pair of nodes.

Block 1006 may involve applying an artificial neural network (ANN) to the video graph to compute both (i) predicted labels for the nodes of the video graph corresponding to predicted video-frame labels of the video frames, and (ii) predicted clusters of the nodes corresponding to predicted video segments of the sequence. The predicted video segments may include respective sub-sequences of the video frames associated with respective contextually-related subject content. In accordance with example embodiments, the ANN will have previously been trained to compute both predicted training labels for each training node of a training video graph constructed from a training video sequence of training video frames, and predicted training clusters of the training nodes corresponding to predicted membership among respective training video segments of the corresponding training video frames.

Block 1008 may involve further applying the ANN as trained to respectively determine a predicted segment class of each predicted video segment.

Finally, block 1010 may involve recording in memory and/or displaying information associating each video frame with one of the predicted video segments, and, for each respective predicted segment class, an identification of all predicted video segments belonging to the respective segment class.

In accordance with example embodiments, the sequence may be a media program content, and the respective contextually-related subject content may be a media content category. Non-limiting examples of a media content category may be one or more of regular program content, advertising content, program scene content, or thematic program content.

In accordance with example embodiments, analytically constructing the video graph from the sequence of video frames may involve further operations. One operation may involve extracting from each respective video frame timing information indicating temporal position in the sequence, and a respective feature vector characterizing media data of the respective video frame. Another operation may involve creating a respective node associated with each respective video frame and its respective feature vector and timing information. Then, for every respective pair of created nodes, a connecting edge may be determined. A connecting edge may have a length corresponding to a temporal distance between the pair of video frames associated with their respective pair of nodes, and a weight corresponding to a similarity metric of the respective feature vectors of the pair of video frames associated with the respective pair of nodes.

In further accordance with example embodiments, the ANN may include both a graph neural network (GNN) and a clustering ANN. The GNN may be trained to predict a respective embedding training vector for each respective training node of the training video graph. The respective embedding training vector may correspond to a reduced-dimension mapping of a respective training feature vector associated with the respective training node. The clustering ANN may be trained to predict clusters of the training nodes corresponding to the training video frames of the respective training video segments. With this arrangement, applying the ANN to the video graph to compute both (i) the predicted labels for the nodes of the video graph, and (ii) the predicted clusters of the nodes corresponding to predicted video segments may involve applying the trained GNN to the video graph to predict a respective embedding vector for each respective node of the video graph, and then applying the trained clustering ANN to the respective embedding vectors to predict clusters of the nodes, and to predict node labels corresponding to the respective labels of the video frames.

In accordance with example embodiments, further applying the ANN as trained to respectively determine the predicted segment class of each predicted video segment may involve applying the trained clustering ANN to both the predicted clusters of the nodes and the predicted node labels in order to predict the video segment associated with each predicted cluster, and to predict the segment class of each predicted video segment.

In further accordance with example embodiments, recording in memory and/or displaying the information may involve, based on the predicted runtime labels, the predicted runtime video segments, and the predicted runtime segment classes, determining (i) all the video frames of each predicted video segment, and (ii) all predicted video segments of each predicted segment class across a temporal span of the video sequence.

V. Example Variations

Although the examples and features described above have been described in connection with specific entities and specific operations, in practice, there are likely to be many instances of these entities and many instances of these operations being performed, perhaps contemporaneously or simultaneously, on a large scale.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for automated video segmentation carried out by a computing system, the method comprising:
receiving a training sequence of training video frames comprising a plurality of respective training video segments, wherein the respective training video segments comprise non-overlapping respective sub-sequences of the training video frames, each of the respective sub-sequences being associated with respective contextually-related subject content, and wherein each training video frame is associated with a respective label identifying both which particular training video segment it belongs to, and a segment class associated with the particular training video segment;
analytically constructing a training video graph from the training sequence of training video frames, the training video graph comprising nodes connected by edges, wherein each node corresponds to a different one of the respective training video frames, and each edge connects a different particular pair of nodes, and is associated with both a temporal distance between the respective training video frames corresponding to the particular pair of nodes, and a respective similarity metric quantifying similarity between respective features of the respective training video frames corresponding to the particular pair of nodes;
training an artificial neural network (ANN) to compute both (i) a predicted training label for each node of the training video graph, and (ii) predicted clusters of the nodes corresponding to predicted membership among the respective training video segments of the corresponding training video frames, using the training video graph as input to the ANN, and ground-truth clusters of ground-truth labeled nodes, wherein the ground-truth labeled nodes correspond to the training video frames and their associated respective labels, and the ground-truth clusters correspond to the respective training video segments;
further training the ANN to compute a predicted segment class for each of the predicted clusters, using as ground truths the segment classes of the respective training video segments; and
configuring the trained ANN for application to one or more unseen runtime video sequences.

2. The method of claim 1, further comprising:
receiving a runtime sequence of runtime video frames, the runtime video frames being unlabeled with respect to both any video segment of the runtime sequence and any segment class;
analytically constructing a runtime video graph from the runtime sequence of runtime video frames, the runtime video graph comprising runtime nodes connected by runtime edges, wherein each runtime node corresponds to a different one of the respective runtime video frames, and each runtime edge connects a different particular pair of runtime nodes, and is associated with both a temporal distance between the respective runtime video frames corresponding to the particular pair of runtime nodes, and a respective runtime similarity metric quantifying similarity between respective features of the respective runtime video frames corresponding to the particular pair of runtime nodes;

applying the trained ANN to the runtime video graph to compute both (i) a predicted runtime label for each runtime node of the runtime video graph and (ii) predicted runtime clusters of the runtime nodes;

further applying the trained ANN to respectively determine both a predicted runtime video segment associated with each predicted runtime cluster, and a predicted runtime segment class of each predicted runtime video segment; and recording in memory and/or displaying segmentation information, the segmentation information being based on the predicted runtime labels, the predicted runtime video segments, and the predicted runtime segment classes, and including (i) an identification of the predicted runtime video segments, (ii) an association of each respective runtime video frame with one of the predicted runtime video segments, and (iii) for each respective predicted runtime segment class, an identification of all predicted runtime video segments belonging to the respective runtime segment class.

3. The method of claim 1, wherein the training sequence further comprises one or more program-sequences, each corresponding to a respective content program, and each comprising a respective sub-plurality of the plurality of training video segments, wherein the respective contextually-related subject content comprises a media content category, the media content category being at least one of regular program content, advertising content, program scene content, or thematic program content, wherein analytically constructing the training video graph comprises constructing a respective program-content video graph for each of the one or more program-sequences, wherein training the ANN comprises respectively training the ANN for each respective program-content video graph, and wherein further training the ANN comprises further training the ANN for each respective program-content video graph.

4. The method of claim 1, wherein analytically constructing the training video graph from the training sequence of training video frames comprises:

extracting from each respective training video frame the respective label, timing information indicating temporal position in the training sequence, and a respective training feature vector characterizing media data of the respective training video frame;

creating a respective training node associated with each respective training video frame and its respective training feature vector and timing information, and labeled with the respective label of the associated training video frame; and for every respective pair of created training nodes, determining a connecting edge having a length corresponding to a temporal distance between the pair of training video frames associated with respective pair of training nodes, and a weight corresponding to a similarity metric of the respective training feature vectors of the pair of training video frames associated with the respective pair of training nodes.

5. The method of claim 4, wherein the ANN comprises a graph neural network (GNN) and a clustering ANN, and wherein training the ANN to compute both (i) the predicted training labels for each node of the training video graph and (ii) the predicted clusters of the nodes corresponding to predicted membership among the respective training video segments of the corresponding training video frames comprises:

training the GNN to predict a respective embedding training vector for each respective node of the training video graph, the respective embedding training vector comprising a reduced-dimension mapping of the respective training feature vector associated with the respective node; and using the respective embedding training vectors as input, training the clustering ANN to predict clusters of the nodes corresponding to the ground-truth clusters, and to predict node labels corresponding to the respective labels of the training video frames.

6. The method of claim 5, further comprising:

receiving a runtime sequence of runtime video frames, the runtime video frames being unlabeled with respect to both any video segment of the runtime sequence and any segment class;

analytically constructing a runtime video graph from the runtime sequence of runtime video frames, the runtime video graph comprising runtime nodes connected by runtime edges, wherein each runtime node corresponds to a different one of the respective runtime video frames, and each runtime edge connects a different particular pair of runtime nodes, and is associated with both a temporal distance between the respective runtime video frames corresponding to the particular pair of runtime nodes, and a respective runtime similarity metric quantifying similarity between respective features of the respective runtime video frames corresponding to the particular pair of runtime nodes;

applying the trained ANN to the runtime video graph to compute both (i) a predicted runtime label for each runtime node of the runtime video graph and (ii) predicted runtime clusters of the runtime nodes;

further applying the trained ANN to respectively determine both a predicted runtime video segment associated with each predicted runtime cluster, and a predicted runtime segment class of each predicted runtime video segment; and recording in memory and/or displaying segmentation information, the segmentation information being based on the predicted runtime labels, the predicted runtime video segments, and the predicted runtime segment classes, and including (i) an identification of the predicted runtime video segments, (ii) an association of each respective runtime video frame with one of the predicted runtime video segments, and (iii) for each respective predicted runtime segment class, an identification of all predicted runtime video segments belonging to the respective runtime segment class.

7. The method of claim 6, wherein analytically constructing the runtime video graph from the runtime sequence of runtime video frames comprises:

extracting from each respective runtime video frame timing information indicating temporal position in the runtime sequence, and a respective runtime feature vector characterizing media data of the respective runtime video frame;

creating a respective runtime node associated with each respective runtime video frame and its respective runtime feature vector and timing information; and for every respective pair of created runtime nodes, determining a connecting edge having a length corresponding to a temporal distance between the pair of runtime video frames associated with respective pair of runtime nodes, and a weight corresponding to a similarity metric of the respective runtime feature vectors of the pair of runtime video frames associated with the respective pair of runtime nodes, and wherein applying the trained ANN to the runtime video graph to compute both (i) the predicted runtime label for each runtime node of the runtime video graph and (ii) the predicted runtime clusters of the runtime nodes comprises:

applying the trained GNN to the runtime video graph to predict a respective embedding runtime vector for each respective runtime node of the runtime video graph; and applying the trained clustering ANN to the respective embedding runtime vectors to predict clusters of the runtime nodes, and to predict node labels corresponding to the respective runtime labels of the runtime video frames.

8. The method of claim 7, wherein further applying the trained ANN to respectively determine both the predicted runtime video segment associated with each predicted runtime cluster, and the predicted runtime segment class of each predicted runtime video segment comprises:

applying the trained clustering ANN to both the predicted clusters of the runtime nodes and the predicted node labels in order to predict the runtime video segment associated with each predicted runtime cluster, and to predict the runtime segment class of each predicted runtime video segment.

9. A method for automated video segmentation carried out by a computing system, the method comprising:

receiving a sequence of video frames;

analytically constructing a video graph from the sequence of video frames, the video graph comprising nodes connected by edges, wherein each node corresponds to a different one of the respective video frames, and each edge connects a different particular pair of nodes, and is associated with both a temporal distance between the respective video frames corresponding to the particular pair of nodes, and a respective similarity metric quantifying similarity between respective features of the respective video frames corresponding to the particular pair of nodes;

applying an artificial neural network (ANN) to the video graph to compute both (i) predicted labels for the nodes of the video graph corresponding to predicted video-frame labels of the video frames, and (ii) predicted clusters of the nodes corresponding to predicted video segments of the sequence comprising respective subsequences of the video frames associated with respective contextually-related subject content, wherein the ANN has previously been trained to compute both predicted training labels for each training node of a training video graph constructed from a training video sequence of training video frames, and predicted training clusters of the training nodes corresponding to predicted membership among respective training video segments of the corresponding training video frames;

further applying the ANN as trained to respectively determine a predicted segment class of each predicted video segment; and recording in memory and/or displaying information associating each video frame with one of the predicted video segments, and, for each respective predicted segment class, an identification of all predicted video segments belonging to the respective segment class.

10. The method of claim 9, wherein the sequence comprises media program content, and wherein the respective contextually-related subject content comprises a media content category, the media content category being at least one of regular program content, advertising content, program scene content, or thematic program content.

11. The method of claim 9, wherein analytically constructing the video graph from the sequence of video frames comprises:

extracting from each respective video frame timing information indicating temporal position in the sequence, and a respective feature vector characterizing media data of the respective video frame;

creating a respective node associated with each respective video frame and its respective feature vector and timing information; and for every respective pair of created nodes, determining a connecting edge having a length corresponding to a temporal distance between the pair of video frames associated with respective pair of nodes, and a weight corresponding to a similarity metric of the respective feature vectors of the pair of video frames associated with the respective pair of nodes.

12. The method of claim 11, wherein the ANN comprises both a graph neural network (GNN) and a clustering ANN, wherein the GNN is trained to predict a respective embedding training vector for each respective training node of the training video graph, the respective embedding training vector comprising a reduced-dimension mapping of a respective training feature vector associated with the respective training node, and wherein the clustering ANN is trained to predict clusters of the training nodes corresponding to the training video frames of the respective training video segments, and wherein applying the ANN to the video graph to compute both (i) the predicted labels for the nodes of the video graph, and (ii) the predicted clusters of the nodes corresponding to predicted video segments comprises:

applying the trained GNN to the video graph to predict a respective embedding vector for each respective node of the video graph; and applying the trained clustering ANN to the respective embedding vectors to predict clusters of the nodes, and to predict node labels corresponding to the respective labels of the video frames.

13. The method of claim 12, further applying the ANN as trained to respectively determine the predicted segment class of each predicted video segment comprises:

applying the trained clustering ANN to both the predicted clusters of the nodes and the predicted node labels in order to predict the video segment associated with each predicted cluster, and to predict the segment class of each predicted video segment.

14. The method of claim 13, wherein recording in memory and/or displaying the information comprises:

based on the predicted runtime labels, the predicted runtime video segments, and the predicted runtime segment classes, determining (i) all the video frames of each predicted video segment, and (ii) all predicted video segments of each predicted segment class across a temporal span of the video sequence.

15. A system for automated video segmentation, the system comprising:
one or more processors; and
memory storing instructions that, when executed by the one or more processors, cause the system to carry out operations including:
receiving a training sequence of training video frames comprising a plurality of respective training video segments, wherein the respective training video segments comprise non-overlapping respective sub-sequences of the training video frames, each of the respective sub-sequences being associated with respective contextually-related subject content, and wherein each training video frame is associated with a respective label identifying both which particular training video segment it belongs to, and a segment class associated with the particular training video segment;
analytically constructing a training video graph from the training sequence of training video frames, the training video graph comprising nodes connected by edges, wherein each node corresponds to a different one of the respective training video frames, and each edge connects a different particular pair of nodes, and is associated with both a temporal distance between the respective training video frames corresponding to the particular pair of nodes, and a respective similarity metric quantifying similarity between respective features of the respective training video frames corresponding to the particular pair of nodes;
training an artificial neural network (ANN) to compute both (i) a predicted training label for each node of the training video graph, and (ii) predicted clusters of the nodes corresponding to predicted membership among the respective training video segments of the corresponding training video frames, using the training video graph as input to the ANN, and ground-truth clusters of ground-truth labeled nodes, wherein the ground-truth labeled nodes correspond to the training video frames and their associated respective labels, and the ground-truth clusters correspond to the respective training video segments;
further training the ANN to compute a predicted segment class for each of the predicted clusters, using as ground truths the segment classes of the respective training video segments; and
configuring the trained ANN for application to one or more unseen runtime video sequences.

16. The system of claim 15, wherein the operations further include:
receiving a runtime sequence of runtime video frames, the runtime video frames being unlabeled with respect to both any video segment of the runtime sequence and any segment class;
analytically constructing a runtime video graph from the runtime sequence of runtime video frames, the runtime video graph comprising runtime nodes connected by runtime edges, wherein each runtime node corresponds to a different one of the respective runtime video frames, and each runtime edge connects a different particular pair of runtime nodes, and is associated with both a temporal distance between the respective runtime video frames corresponding to the particular pair of runtime nodes, and a respective runtime similarity metric quantifying similarity between respective features of the respective runtime video frames corresponding to the particular pair of runtime nodes;
applying the trained ANN to the runtime video graph to compute both (i) a predicted runtime label for each runtime node of the runtime video graph and (ii) predicted runtime clusters of the runtime nodes;
further applying the trained ANN to respectively determine both a predicted runtime video segment associated with each predicted runtime cluster, and a predicted runtime segment class of each predicted runtime video segment; and
recording in memory and/or displaying segmentation information, the segmentation information being based on the predicted runtime labels, the predicted runtime video segments, and the predicted runtime segment classes, and including (i) an identification of the predicted runtime video segments, (ii) an association of each respective runtime video frame with one of the predicted runtime video segments, and (iii) for each respective predicted runtime segment class, an identification of all predicted runtime video segments belonging to the respective runtime segment class.

17. The system of claim 15, wherein analytically constructing the training video graph from the training sequence of training video frames comprises:
extracting from each respective training video frame the respective label, timing information indicating temporal position in the training sequence, and a respective training feature vector characterizing media data of the respective training video frame;
creating a respective training node associated with each respective training video frame and its respective training feature vector and timing information, and labeled with the respective label of the associated training video frame; and
for every respective pair of created training nodes, determining a connecting edge having a length corresponding to a temporal distance between the pair of training video frames associated with respective pair of training nodes, and a weight corresponding to a similarity metric of the respective training feature vectors of the pair of training video frames associated with the respective pair of training nodes.

18. The system of claim 17, wherein the ANN comprises a graph neural network (GNN) and a clustering ANN,
and wherein training the ANN to compute both (i) the predicted training labels for each node of the training video graph and (ii) the predicted clusters of the nodes corresponding to predicted membership among the respective training video segments of the corresponding training video frames comprises:
training the GNN to predict a respective embedding training vector for each respective node of the training video graph, the respective embedding training vector comprising a reduced-dimension mapping of the respective training feature vector associated with the respective node; and
using the respective embedding training vectors as input, training the clustering ANN to predict clusters of the nodes corresponding to the ground-truth clusters.

19. The system of claim 18, wherein the operations further include:
receiving a runtime sequence of runtime video frames, the runtime video frames being unlabeled with respect to both any video segment of the runtime sequence and any segment class;

analytically constructing a runtime video graph from the runtime sequence of runtime video frames, the runtime video graph comprising runtime nodes connected by runtime edges, wherein each runtime node corresponds to a different one of the respective runtime video frames, and each runtime edge connects a different particular pair of runtime nodes, and is associated with both a temporal distance between the respective runtime video frames corresponding to the particular pair of runtime nodes, and a respective runtime similarity metric quantifying similarity between respective features of the respective runtime video frames corresponding to the particular pair of runtime nodes;

applying the trained ANN to the runtime video graph to compute both (i) a predicted runtime label for each runtime node of the runtime video graph and (ii) predicted runtime clusters of the runtime nodes;

further applying the trained ANN to respectively determine both a predicted runtime video segment associated with each predicted runtime cluster, and a predicted runtime segment class of each predicted runtime video segment; and recording in memory and/or displaying segmentation information, the segmentation information being based on the predicted runtime labels, the predicted runtime video segments, and the predicted runtime segment classes, and including (i) an identification of the predicted runtime video segments, (ii) an association of each respective runtime video frame with one of the predicted runtime video segments, and (iii) for each respective predicted runtime segment class, an identification of all predicted runtime video segments belonging to the respective runtime segment class.

20. The system of 19, wherein analytically constructing the runtime video graph from the runtime sequence of runtime video frames comprises:

extracting from each respective runtime video frame timing information indicating temporal position in the runtime sequence, and a respective runtime feature vector characterizing media data of the respective runtime video frame;

creating a respective runtime node associated with each respective runtime video frame and its respective runtime feature vector and timing information; and for every respective pair of created runtime nodes, determining a connecting edge having a length corresponding to a temporal distance between the pair of runtime video frames associated with respective pair of runtime nodes, and a weight corresponding to a similarity metric of the respective runtime feature vectors of the pair of runtime video frames associated with the respective pair of runtime nodes, wherein applying the trained ANN to the runtime video graph to compute both (i) the predicted runtime label for each runtime node of the runtime video graph and (ii) the predicted runtime clusters of the runtime nodes comprises:

applying the trained GNN to the runtime video graph to predict a respective embedding runtime vector for each respective runtime node of the runtime video graph; and applying the trained clustering ANN to the respective embedding runtime vectors to predict clusters of the runtime nodes, and to predict node labels corresponding to the respective runtime labels of the runtime video frames, and wherein further applying the trained ANN to respectively determine both the predicted runtime video segment associated with each predicted runtime cluster, and the predicted runtime segment class of each predicted runtime video segment comprises:

applying the trained clustering ANN to both the predicted clusters of the runtime nodes and the predicted node labels in order to predict the runtime video segment associated with each predicted runtime cluster, and to predict the runtime segment class of each predicted runtime video segment.

* * * * *